(12) United States Patent
Fenrich et al.

(10) Patent No.: US 8,077,934 B2
(45) Date of Patent: Dec. 13, 2011

(54) LOW POWER FINGERPRINT CAPTURE SYSTEM, APPARATUS, AND METHOD

(75) Inventors: Richard Fenrich, Blacksburg, VA (US); Nicholas Salerno, Blacksburg, VA (US); Jeremy Hutchins, Centreville, VA (US); Michael Pedigo, Dublin, VA (US); Carl Gaebe, Blacksburg, VA (US)

(73) Assignee: Identification International, Inc., Blacksburg, VA (US)

( * ) Notice: Subject to any disclaimer, the term of this patent is extended or adjusted under 35 U.S.C. 154(b) by 768 days.

(21) Appl. No.: 12/194,359

(22) Filed: Aug. 19, 2008

(65) Prior Publication Data

US 2008/0317301 A1 Dec. 25, 2008

(51) Int. Cl.
  *G06K 9/00* (2006.01)
(52) U.S. Cl. ......................... 382/124; 382/126; 382/127
(58) Field of Classification Search .................. 382/124, 382/126, 127, 313, 314, 315; 340/5.52, 5.53, 340/5.82, 5.83, 356; 358/496, 497, 486; 250/234
See application file for complete search history.

(56) References Cited

U.S. PATENT DOCUMENTS

| | | | |
|---|---|---|---|
| 3,200,701 A | 8/1965 | White | |
| 3,679,307 A | 7/1972 | Zoot et al. | 356/4 |
| 4,258,994 A | 3/1981 | Task | 354/75 |
| 4,414,684 A | 11/1983 | Blonder | 382/4 |
| 4,541,113 A * | 9/1985 | Seufert et al. | 382/124 |
| 4,933,976 A | 6/1990 | Fishbine et al. | 382/4 |
| 5,359,691 A | 10/1994 | Tai et al. | 385/146 |
| 5,390,276 A | 2/1995 | Tai et al. | 385/146 |
| 5,548,394 A | 8/1996 | Giles et al. | 356/71 |
| 5,621,516 A | 4/1997 | Shinzaki et al. | 356/71 |
| 5,629,764 A | 5/1997 | Bahuguna et al. | 356/71 |
| 5,650,842 A | 7/1997 | Maase et al. | 356/71 |
| 5,796,858 A | 8/1998 | Zhou et al. | 382/127 |
| 5,854,872 A | 12/1998 | Tai | 385/133 |
| 5,900,993 A | 5/1999 | Betensky | 359/710 |
| 6,061,463 A | 5/2000 | Metz et al. | 382/124 |
| 6,069,969 A | 5/2000 | Keagy et al. | 382/124 |
| 6,178,255 B1 | 1/2001 | Scott et al. | 382/124 |
| 6,259,108 B1 | 7/2001 | Antonelli et al. | 250/556 |
| 6,355,937 B2 | 3/2002 | Antonelli et al. | 250/556 |

(Continued)

FOREIGN PATENT DOCUMENTS

EP    1 239 404 A2    9/2002

(Continued)

*Primary Examiner* — Brian Le
(74) *Attorney, Agent, or Firm* — Pillsbury Winthrop Shaw Pittman LLP

(57) ABSTRACT

The present invention provides a large format fingerprint capture apparatus, system and method that is low power, compact, and lightweight and has a platen area greater than 3.0 square inches. The present system is typically powered, controlled, and exchanges data over a single data/control/power connection to a host PC, e.g., a desk top computer, PDA, or laptop computer although the system can also be used in a wireless fashion with a power subsystem so no physical connections are required. In a preferred embodiment the large format fingerprint device is directly connected to a completely disconnected portable PC, such as a laptop having only a battery power source. The primary system components of the present invention combine to minimize power, size and weight and, thus, enhance portability and battery life. The system typically includes a light source, a prism, a camera (including the lens), and a case. Optional elements comprise holographic elements such as gratings and holographic optical elements (HOEs), a battery subsystem, magnetic stripe reader, barcode reader, platen heater, platen blower, and mirrors to divert the image beam.

23 Claims, 22 Drawing Sheets

U.S. PATENT DOCUMENTS

| | | |
|---|---|---|
| 6,407,804 B1 | 6/2002 | Hillmann et al. ............... 356/71 |
| 6,429,927 B1 | 8/2002 | Borza ............................ 356/71 |
| 6,628,814 B1 | 9/2003 | Shapiro ........................ 382/127 |
| 6,643,390 B1 | 11/2003 | Clark et al. ................... 382/124 |
| 6,647,133 B1 | 11/2003 | Morita et al. ................. 382/124 |
| 6,665,427 B1 | 12/2003 | Keagy et al. .................. 382/124 |
| 6,804,382 B1 | 10/2004 | Dickinson et al. ............ 382/124 |
| 6,950,196 B2 | 9/2005 | Fielden et al. ................ 356/630 |
| 6,970,584 B2 | 11/2005 | O'Gorman et al. .......... 382/126 |
| 7,009,646 B1 | 3/2006 | Fossum et al. ................ 348/294 |
| 7,035,444 B2 | 4/2006 | Kunieda et al. .............. 382/125 |
| 7,050,609 B2 | 5/2006 | Huang .......................... 382/124 |
| 7,130,456 B2 | 10/2006 | Hillmann ..................... 382/127 |
| 7,132,612 B2 | 11/2006 | Lapstun ................... 178/19.05 |
| 7,812,936 B2 | 10/2010 | Fenrich et al. ................. 356/71 |
| 7,822,236 B2 | 10/2010 | Fenrich et al. ............... 382/124 |
| 7,903,242 B2 | 3/2011 | Fenrich et al. ................. 356/71 |
| 2001/0050765 A1 | 12/2001 | Antonelli et al. .............. 356/71 |
| 2002/0110263 A1 | 8/2002 | Thompson ................... 382/115 |
| 2002/0124537 A1 | 9/2002 | Manna et al. ................ 55/385.2 |
| 2002/0126882 A1 | 9/2002 | Funahashi .................... 382/124 |
| 2003/0016847 A1 | 1/2003 | Quintana ..................... 382/124 |
| 2003/0122958 A1 | 7/2003 | Olita et al. ................... 348/373 |
| 2003/0133143 A1 | 7/2003 | McClurg et al. ............. 358/1.14 |
| 2004/0041998 A1 | 3/2004 | Haddad .......................... 356/71 |
| 2005/0169506 A1 | 8/2005 | Fenrich et al. ............... 382/127 |
| 2005/0249390 A1 | 11/2005 | McClurg et al. ............. 382/127 |
| 2010/0289886 A1 | 11/2010 | Fenrich et al. ................. 348/77 |
| 2011/0013174 A1 | 1/2011 | Fenrich et al. ................. 356/71 |

FOREIGN PATENT DOCUMENTS

| | | |
|---|---|---|
| WO | WO 97/43607 | 11/1997 |
| WO | WO 01/01330 | 1/2001 |
| WO | WO 2005/001753 | 1/2005 |

* cited by examiner

PRIOR ART

LOW POWER FINGERPRINT CAPTURE SYSTEM, APPARATUS, AND METHOD

This is a non-provisional application claiming priority from U.S. patent application Ser. No. 11/030,327 ("the '327 Application"), filed Jan. 7, 2005, which in turn claims priority from of U.S. Provisional Patent Application Ser. No. 60/534,394 ("the '394 Application"), filed Jan. 7, 2004. The '327 Application and the '394 application are both hereby incorporated by reference into this disclosure in their entirety.

BACKGROUND OF THE INVENTION

1. Field of the Invention

The present invention relates to a system, apparatus, and method for the collection of friction ridge signatures from a subject. More particularly, the present invention relates to a low power consumption, small size, and low weight friction ridge capturing device and method for the collection of friction ridge signatures from a subject. Most particularly, the present invention relates to a low power consumption, compact, and portable digital friction ridge capturing apparatus, system and method for the collection of friction ridge signatures with a platen area of at least 3.0 square inches.

2. Description of the Related Art

Human beings have friction ridges on their hands and feet. Friction ridge impressions from a subject's fingers are commonly known as fingerprints. Animals also commonly have unique friction patterns on their footpads. In dogs and cats, for example, these patterns are called paw prints.

Digital scanning systems that capture friction ridge impressions, collectively termed herein as 'fingerprints', are old in the art. Many of these systems were designed to capture a smaller area of one or two fingerprints while others were designed to capture a much larger area. Such existing systems commonly use optical imaging, capacitance, infrared radiation, ultrasound, or other means to capture fingerprints.

Many optical imaging systems are designed to capture one or two fingerprints at a time. These systems are termed 'single print devices' herein. For example, the manufacturers listed in Table 1 provide optical devices that scan one or two fingerprints at a time.

TABLE 1

| Name | Web Address |
|---|---|
| Cross Match Technologies | http://www.crossmatch.com |
| Exact ID | http://www.exactid.com/ |
| Identix | http://www.identix.com/ |
| Secugen | http://www.secugen.com |

Devices that capture a single fingerprint at a time are compact and draw minimal power during operation. One of the first issued patents that discloses how such a single digit device works is U.S. Pat. No. 3,200,701 to White, the entire contents of which is hereby incorporated by reference as if fully set forth herein. White teaches a device that uses a light source, a prismatic body, the principle of Total Internal Reflection "TIR", and a scanning apparatus to capture a fingerprint image. A typical TIR scanning system that captures fingerprint images comprises a light source, a prism, a camera, and a host computer or other control device that is used to capture the image. It should be understood that the camera is any type of suitable sensor for the capture of image data. This includes Charge Coupled Devices (CCD) and Complimentary Metal Oxide Semiconductor (CMOS) cameras as well as sensor chips included in these cameras and both linear and area scan versions. The host computer or other control device is referred to as a host computer. There may be other components of a prior art system such as, e.g., polarizing filters, corrective optics, and holographic gratings.

Most commercially available large format optical systems today follow this single digit system configuration. That is, they use a light source, prismatic body, TIR, camera(s), and host computer to create fingerprint images. For prior art devices, "capable of capturing more than two fingerprints simultaneously" means optical devices having a surface capture area exceeding 3.0 square inches. This type of system is referred to as a large format fingerprint capture system. In addition, large format fingerprint capture systems include those that capture palm prints and writer's edge.

Large format fingerprint devices typically capture fingerprints from multiple fingers simultaneously and therefore, the area upon which the subjects place their fingers must be large enough to accommodate the maximum number of fingers to be captured simultaneously. Usually, this number is four, but Cross Match Technologies provides a system that is able to capture the fingerprints in two groups of two fingerprints apiece. In effect, this Cross Match Technologies system captures four fingerprints simultaneously.

Livescan systems, one common form of large format fingerprint system, typically use a glass or plastic surface, termed a platen, upon which the subject's fingers are rolled or pressed. Images of the fingers' ridges are typically captured from underneath the platen by one or multiple cameras and are then converted into digital files. Images of rolled fingers are called rolled prints and images of pressed fingers are called slaps. Livescan devices are available from the sources listed in TABLE 2.

TABLE 2

| Name | Web Address |
|---|---|
| Cross Match Technologies | http://www.crossmatch.com |
| Heimann Biometric Systems | http://www.hbs-jena.com/ |
| Identix | http://www.identix.com/ |
| Printrak | http://www.printrakinternational.com/ |

A large body of patents exists for large format fingerprint scanning devices. U.S. Pat. No. 3,200,701 to White, discussed above, discloses one such system. Further, U.S. Pat. No. 4,933,976 to Fishbine et al., the entire contents of which are hereby incorporated by reference as if fully set forth herein, teaches a configuration comprising a prismatic-based TIR device for fingerprint capture. Fishbine et al. disclose a method that combines successively captured images into one image array.

U.S. Pat. Nos. 5,548,394, 5,629,764, 5,650,842, 6,178,255, and 6,407,804 all disclose variations of the TIR based prismatic platen device used to capture fingerprint images.

In U.S. Pat. No. 5,548,394 to Giles et al., the entire contents of which are hereby incorporated by reference as if fully set forth herein, teaches a TIR based system that uses a linear CCD camera (as opposed to an area based camera) and associated optics that is used to create rolled fingerprints. Prints are captured by changing the orientation of a mirror as a scan progresses.

U.S. Pat. No. 5,629,764 to Bahuguna et al., the entire contents of which are hereby incorporated by reference as if fully set forth herein, teaches correcting the aspect ratio of images using holographic gratings. Light incident on the fingerprint surface is totally internally reflected at the surface of the prism but immediately after being reflected back toward the prism the light enters a holographic grating that changes the light direction. Light, directed now at the hypotenuse of the prism at an angle greater than the critical angle, is total internally reflected toward the camera. In this patent, the aspect ratio is corrected before the light leaves the prism.

U.S. Pat. No. 5,650,842 to Maase et al., the entire contents of which are hereby incorporated by reference as if fully set forth herein, discloses a fingerprint capture system that optically corrects the aspect ratio of images after the image beam leaves the prism. Correction is achieved by including optical elements in the image path after the image exits the prism. The image may be generated using TIR or light dispersion from the friction ridges. A reference light source is an edge lit light panel manufactured by Hewlett-Packard that is illuminated by red Light Emitting Diodes (LEDs)

U.S. Pat. No. 6,178,255 Scott et al., the entire contents of which are hereby incorporated by reference as if fully set forth herein, discloses a method and apparatus in which a mechanism slides a prism over an imaged area of a camera. By using a linear encoding mechanism, the method and apparatus splices together complete fingerprint images from the smaller portions of the fingerprint that are captured when sliding the prism over the camera.

U.S. Pat. No. 6,407,804 to Hillman et al., the entire contents of which are hereby incorporated by reference as if fully set forth herein, discloses a fingerprint capture system with embedded reference targets in the optical path. Using these reference targets, the system can be calibrated at anytime using these internal reference targets. This patent also discloses use of a planar light source constructed from a two dimensional array of LEDs followed by a diffusor.

Several patented systems do not teach that TIR be used at the fingerprint imaging surface in order for a fingerprint to be captured. Such systems are disclosed in U.S. Pat. Nos. 5,621,516, 5,650,842 and 6,061,463.

U.S. Pat. No. 5,621,516 to Shinzaki et al., the entire contents of which are hereby incorporated by reference as if fully set forth herein, discloses a system that images randomly reflected light from the friction ridges. By providing means of minimizing the light content reflected by platen areas not in contact with the friction edges, the contrast of the resulting images are improved. U.S. Pat. No. 5,650,842 to Maase et al., discussed above, provides another mechanism for capture of friction ridges via light dispersion.

U.S. Pat. No. 6,061,463 to Metz et al., the entire contents of which are hereby incorporated by reference as if fully set forth herein, teaches using a slanted-fringed light diffractive grating to redirect light perpendicularly toward the platen surface. Light reflected from the surface is then captured by the camera. Light incident upon the friction ridges is dispersed and therefore this less intense reflection is imaged as dark. One disclosed embodiment uses volume holograms to redirect light. This patent contrasts with U.S. Pat. No. 5,629,764 to Bahuguna et al. in that this patent redirects the light before it reaches the platen surface and therefore image aspect correction is never required.

Based on the foregoing discussion, most, if not all, existing commercial large format fingerprint devices use the principle of TIR. In the majority of these devices, the object plane to be imaged (the fingerprint) and the image plane of the camera are not parallel, centered, and perpendicular to a common axis. To correct for optical perspective distortions introduced by the relative positions of the object and image planes optics within the device must correct the positions of the object and/or image planes before the camera captures an image or the system must employ an algorithmic solution for correcting the perspective distortion introduced into the image. In the first case, if additional optical components are added, the size and weight of the device increase. For example, see U.S. Pat. Nos. 5,650,842 and 6,407,804. In the later cases, to avoid an unfocused image the depth of field must be deep enough for the entire object area to be in focus. Since the image is not optically corrected for perspective distortion, the depth of field requirement is driven by the three dimensional geometry of the platen, the optics used between the platen surface and the camera, and the geometric relationship between the camera and the platen surface. Typically, lenses that allow larger depths of field have focal lengths such as 30 mm or greater with corresponding f-stops often greater than 4.0. Long focal length lenses often result in a distance from the object plane to the image plane that is too large to put the entire device into a physically compact solution. In addition, high f-stop lenses restrict the amount of light entering a camera and therefore more light, power, and/or exposure are needed for these systems, thus implying a larger power consumption.

Often aberrations in the periphery of the image such as barrel distortion and pincushion distortion distort the fingerprint to the point where the images are not truly usable. Barrel distortion occurs when the distance of the pixels along the image edges are farther away from the center of the image than the corresponding actual distance in the target. Pincushion distortion occurs when the pixels along the images edges are closer to the center of the image that the corresponding actual distance in the target. Barrel and pincushion distortions are introduced via lenses used in an optical system and both distortion types may be present at the same time.

The majority of existing optical fingerprint systems rely on LEDs for light sources. Light illuminating the platen may be either diffuse or collimated.

Electricity consumers in a fingerprint device include the light source(s), the camera(s), frame grabber electronics, magnetic stripe readers, barcode readers, radio frequency identification modules, proximity card readers, smartcard readers, displays, platen heaters, platen blowers, and servomotors, if present. In total, the power used by such systems is above 10 watts for all existing large format fingerprint systems. Therefore, prior art large format fingerprint devices are powered by external power sources connected via separate cabling since power provided over a single data/control/power cable will either be insufficient or the battery on the attached computer will be drained too quickly. In other words, prior art systems cannot be powered only from the computer to which the device is attached.

Most of the patented systems described above are either not compact or not lightweight and therefore they cannot be considered as portable. To be moved, these devices often require a protective case. In existing instances, the device and case weigh over 30 pounds. In addition, many devices must be re-calibrated once the device has been moved and reinstalled. Such re-calibration is required due to the presence of moving parts or the possibility that parts have moved relative to one another.

Such systems also commonly address the issue of condensation on the platen. Such condensation occurs when the dew point around the platen/finger is too high relative to the ambient temperature of the prism and therefore moisture from the finger condenses on the prism. In such cases, platen heaters and platen blowers have been used to minimize the condensation effects to the image.

No prior art large format fingerprint scanning device has the ability to pass all data, power, and control logic over a single physical connection to the device. In addition, image-processing means to identify the start and stop points of a fingerprint image capture session also do not currently exist. Rather, external controls such as foot pedals, touch screens, keyboard keys, and buttons located on the device are commonplace as means to identify start and stop points for capturing fingerprint images.

SUMMARY OF THE INVENTION

Thus, there is a need for a fingerprint capture device that combines the features of small size, low weight, low power consumption, and incorporates non-external fingerprint start-stop scanning control. The system, apparatus, and method of the present invention preferably provides these features by:

1. balancing depth of field and lens focal length requirements;
2. algorithmically correcting image aberrations on the lens periphery via hardware, firmware or software;
3. algorithmically correcting perspective image distortions via hardware, firmware or software;
4. generating fingerprint images using minimal power, at most about 3.0 watts, preferably at most about 2.5 watts, while being able to meet the electrical requirements of the electrical components (such as light source, camera, magnetic stripe reader, radio frequency identification (RFID) module, proximity card reader, smartcard reader, platen heater, platen blower, and barcode reader), e.g., the camera requires at most about 2 watts and preferably at most about 1.8 watts;
5. minimizing the number of internal components as well as their weight and size so that the device weighs at most about 10 lbs and has a volume at most about 400 in$^3$ and preferably weighs at most about 7 lbs, more preferably less than 5 lbs and preferably has a volume less than about 325 in.$^3$, e.g., 9 in.×7 in.×5 in.=315 in.$^3$ or at most about 4.7 in.×2 in.×16 in.=240 in.$^3$;
6. building a device interface utilizing at most a single cable connection that combines data, control, and power (e.g., USB, FireWire, Ethernet); and
7. enabling capture of fingerprint images using image processing of the images themselves as capture start and capture finish signals (auto triggers).

The present invention overcomes the deficiencies of prior art large format fingerprint devices by providing a fingerprint capture apparatus, system and method that is low power, compact, and lightweight and has a platen area greater than about 3.0 square inches, e.g., from about 3 to about 24 square inches. Further, the present invention is typically powered, controlled, and exchanges data over a single data/control/power connection to a host PC. In an alternative preferred embodiment the large format fingerprint device is directly connected to a completely disconnected (not plugged in to a wall power outlet or other external power source) portable PC, such as a laptop having a battery power source. In another preferred embodiment a wireless interface (e.g. infrared, 802.11b, Bluetooth, etc.) to the device exchanges data and accepts control functions from an attached computer processor while the device runs on a completely self-contained power subsystem such as a battery. In such an embodiment the device may have no physical connection ports. If desired, the device exchanges data and accepts control functions via internet and/or satellite connectivity to a computer processor.

In some embodiments the device may have an internal computational capability so it can direct fingerprint capture and fingerprint matching within the device using fingerprint templates that are delivered over a wired or wireless network attached to the device. Typical applications of such devices would be access control and tracking applications. The matching templates and algorithm could be updated over the electronic interface.

The primary device components of the present invention combine to minimize required power, size and weight. The device of the present invention comprises a light source, a prism, a camera (including the lens), a housing, and a host computer. Optional elements comprise holographic elements such as gratings and holographic optical elements (HOEs), a battery subsystem, an image processing subsystem, optical filters, magnetic stripe reader, RFID module, proximity card reader, smartcard reader, barcode reader, a platen heater, a platen blower, and mirrors used to divert the image beam.

To achieve minimal size and weight the number of components is minimized in the system, apparatus, and method of the present invention. Technology for aspect ratio changes, image aberration corrections, and perspective corrections may be used to minimize the depth of field, as taught by U.S. Pat. Nos. 5,629,764 and 6,061,463 incorporated herein by reference. Alternatively, aspect ratio, image aberration, and perspective corrections can be made algorithmically via hardware, firmware and software as provided for in the present invention. Ojanen, see Appendix A, teaches one way of removing image aberrations and perspective distortions via such algorithms. Also, technology may be used to maximize the amount of light generated per watt, as taught, by U.S. Pat. Nos. 5,359,691 to Tai et al., 5,390,276 to Tai et al., and 5,854,872 to Tai, which are hereby incorporated by reference as if fully set forth herein.

As disclosed in U.S. Pat. Nos. 5,629,764 and 6,061,463 incorporated herein by reference, technologies to reduce the required depth of field to near zero exist. These technologies typically work by redirecting the light in the device with holographic gratings or other suitable replacements. Any optical technology that allows the object plane and image plane to be properly aligned suffices but, the added advantage of the holographic elements as disclosed in U.S. Pat. Nos. 5,629,764 and 6,061,463 is that they take a small amount of space. Since the object plane and image plane are properly aligned, there is no need for heavier and more space consuming optics to perform optical image correction.

An alternative way to improve the depth of field without redirecting light or adding optical components is provided by this invention. Since the prisms used in these devices are formed from planar surfaces, a real object placed onto the planar platen surface can be described as a planar virtual object that appears closer to the camera than the real object. The plane orientation of the virtual object can be used in conjunction with the lateral magnification to generate an angle at which to orient the sensor chip in the camera so as to minimize the required depth of field.

More specifically, in referring to FIG. 10A, a simple optical system has an object 1005, a lens 1001, a focus 1002, and an image 1006. The distance along the optical axis from the principal point to the object is the object distance 1004, o, and the distance along the optical axis from the principal point to the image is the image distance 1003, i. A optical system's lateral magnification is defined as m=i/o. Referring again to FIG. 10A, if a planar object is imaged and that planar object is rotated by angle $\alpha_o$ 1007 from the normal to the optical axis, this planar object appears as a real inverted image oriented with angle $\alpha_i$ 1008 where $\alpha_i = \tan^{-1}(m \ast \tan(\alpha_o))$ with respect to the optical axis normal. The angle $\alpha_i$ is defined by $\alpha_o$ and m.

Now referring to FIG. 10B, the angle θ 1009 and the index of refraction n are properties of the prism 1010. In an imaging system such as FIG. 2 and FIG. 10B, a real object 1005 at the prism surface is imaged as a virtual object 1012. In FIG. 10B, the virtual object appears at an angle $\alpha_v$ 1011 where $\alpha_v = \tan^{-1}(\tan(\theta)/n)$. Consequently, given an ideal optical device setup, $\alpha_v$ is known and therefore $$\alpha_i = \tan^{-1}(m \ast \tan(\theta)/n).$$

If the image sensor plane is placed at angle $\alpha_i$ in the ideal system setup, the depth of field will be zero. For example, if m=1/13, θ=45 degrees, and n=1.52, then $\alpha_i$=2.89 degrees.

Collimation or semi-collimation of the light source increases the efficiency at which the device uses light. Usage of more collimated light means that less overall light is needed for the camera to generate images. The higher the overall light efficiency, the lower the requirements for power and light size. U.S. Pat. Nos. 5,359,691, 5,390,276 and 5,854,872, all disclose compact light pipes that utilize microprismatic structures to guide light in a semi-collimated manner. These light pipes efficiently convert diffuse light from a Cold Cathode Fluorescent Light (CCFL) into semi-collimated light.

After an image has been captured, it may need to have perspective, barrel and pincushion distortions removed. Typically, barrel and pincushion distortions are removed first, then perspective distortion is removed. Optics have traditionally served this purpose. But, in this invention, barrel and pincushion aberrations can be removed with an algorithm developed by Ojanen. A pre-print describing this algorithm and software that implements the algorithm may be found in Appendix A and at http://www.math.rutgers.edu/~ojanen/, the entire contents of which are hereby incorporated by reference as if fully set forth herein. The Ojanen algorithm relies on the capture of a high accuracy image of a fixed array of dots of a particular size. By knowing the size and locations of the dots within a grid, the systematic discovery of barrel and pincushion distortions can be characterized by running a least squares algorithm on the error between the observed dot locations and sizes and the known dot locations and sizes. Correction of the distortions is then completed using the returned least squares parameters. Typically, the present invention employs a perspective correction algorithm in addition to the Ojanen algorithm.

In the present invention, depth of field issues in some embodiments do not drive the lens requirement so a shorter focal distance lens can be used at the expense of potentially increasing aberrations. But, since such aberrations are predictable, they can be reasonably corrected using software that implements the Ojanen algorithm. Another important side effect of a shorter focal length lens is the f-stop setting. Since a low depth of field is required, a lower f-stop lens is used so that more efficient use is made of the light and thus size and power requirements are further reduced.

The system power requirements of the present invention are reduced to the point that the device can be run within the limits of the power supplied via common computer interfaces such as FireWire and USB, e.g., USB-2, (FireWire can provide up to 50 watts of power and USB up to 2.5 watts). The unanticipated and non-obvious innovation of the present invention is enabling the fingerprint device to be powered by a completely disconnected laptop computer while maximizing the battery life of the laptop and thereby extending the useful amount of time the system can be used. The invention provides for a device that consumes at most about 3.0 watts of power, preferably at most about 2.5 watts of power. Typically, the light uses at most about 1 watt, preferably at most about 0.7 watts and the camera uses at most about 2 watts, preferably at most about 1.8 watts.

In the device, apparatus, and method of the present invention, as one alternative to LED light sources, a CCFL is used. Other light sources include electroluminescent sources and lasers. The power source for this light is an electrical inverter that taps power off from the power originating from the host computer interface. A single CCFL is used to illuminate a light pipe that partially collimates the light before sending the light into a prism. This CCFL and light pipe construction, as described in U.S. Pat. Nos. 5,359,691, 5,390,276, and 5,854,872 generates enough light at a low power to serve as the system light source for the apparatus, system and method of the present invention. The rated lifetime of such CCFL's is about 10,000 hours of operation. As with LEDs, the rated lifetime is the amount of time the light is on at the rated power until the light output is one half of the original output. Not only does the light source emit enough light for the apparatus, system and method of the present invention, it also is delivered in a very compact size and thus contributes to the size of the apparatus, system and method of the present invention.

In the apparatus, system and method of the present invention, two electrical loads exist in every embodiment: the light source load and the camera load. In a preferred embodiment, the light source load comprises the electrical inverter and the CCFL. In alternative embodiments, there are at least several other loads: an optional electrical storage device, a magnetic stripe reader, RFID module, proximity card reader, smartcard reader, and a barcode reader. In alternative embodiments, a battery, solar cell or capacitor subsystem is used to supply electrical energy to system components. In particular, such a subsystem is needed in the case where more power is needed than the computer interface can provide. This can be the case, for instance, in an embodiment comprising at least one of a magnetic stripe reader, an RFID module, a proximity card reader and a smartcard reader to read demographic data from the back of a driver's license and an embodiment comprising a one dimensional or two dimensional barcode reader to read the demographic data from the bar code on the back of a driver's license.

In alternative embodiments, images are captured with either a one-dimensional (line scan) or two-dimensional (area scan) camera. Preferred embodiments comprise area scan cameras to increase system robustness by avoiding the use of moving parts. In these embodiments, the image generated must be large enough to capture the entire object area at a prescribed resolution. Two such cameras with USB 2.0 interfaces are the Silicon Imaging SI-3170-U and the Silicon Imaging SI-6600-U cameras.

In a preferred embodiment, the camera uses the light provided by the light pipe to capture images of rolled and slapped impressions of fingerprints. The electrical interface to the camera also comprises the control signals that operate the camera, operate the magnetic stripe reader, operate the barcode reader, operated the RFID module, operate the proximity card reader, operate the smart card reader, and turn the light source on and off. That is, in a preferred embodiment, all power, control, and data to be exchanged between the host computer and the fingerprint device are exchanged via the single connection between the computer and the device.

An important aspect of the control logic to capture fingerprints is how to determine when to start capturing a print and when to stop capturing a print. In preferred embodiments of the apparatus, system and method of the present invention, this control logic is implemented in software since the frame rate of the images delivered by the camera is high enough to allow processing on the host computer that algorithmically identifies a starting frame and an ending frame for each fingerprint capture. Typically, for a single finger roll the real frame rate is 20 frames or more per second, which results in a 12-13 or more processed frames per second rate. Typically, for a four finger slap image the real frame rate is at least 6 frames per second which results in an at least 4 processed frames per second rate. As a rolled fingerprint is being captured frame-by-frame, individual frames are analyzed and combined into a rolled print so that when the ending frame is identified, the combined rolled image is complete. Preferably, the frame rate for a rolled image is sufficient to obtain a real-time image.

In summary, in a preferred embodiment, the apparatus, system and method of the present invention provide a light source and camera combination that has a power and light efficiency that allows a large format fingerprint device to be powered, controlled, and to exchange data digital image frames over a single connection, such as a USB 2.0 cable connection. Alternative embodiments include FireWire 1.0, FireWire 2.0 and next generation peripheral interfaces. Alternative embodiments also include a power subsystem wherein a battery or capacitor is charged during periods of low power consumption and when more power is required more power is drawn from the power subsystem.

In order to ensure continued operation of the apparatus, system and method of the present invention, non-volatile memory is included inside the device so that statistical and diagnostic data can be collected and monitored. In a preferred embodiment, the number of times the light source switches on and off is maintained in non-volatile memory so that a predetermined maintenance schedule can be followed.

DETAILED DESCRIPTION OF THE PREFERRED EMBODIMENTS

The present invention focuses on the use of optical imaging to provide an optical fingerprint scanning apparatus, system and method for capturing more than two fingerprints simultaneously.

A camera as used herein is minimally the combination of a lens and an image capture capability. For digital cameras, such image capture capability includes an image sensor and a frame grabber that converts the sensed image data to a digital format, e.g., an image frame. For film cameras, the image capture capability is provided by film. Digital cameras optionally have interfaces to transfer digitized images to a system for processing.

An image frame as used herein is data output by the camera that represents at least a portion of the scene, which the camera is capturing A capture sequence as used herein is a series of at least one image frame provided by the camera from which at least one image frame is selected for generating an output composite image.

A physical connection port as used herein is a connector whereby a cable or other physical electronic communication mechanism is operatively attached to the connector.

A roll capture sequence as used herein is a capture sequence used to generate a composite rolled fingerprint image.

A slap capture sequence as used herein is a capture sequence used to generate a slap fingerprint image.

Figure 1:
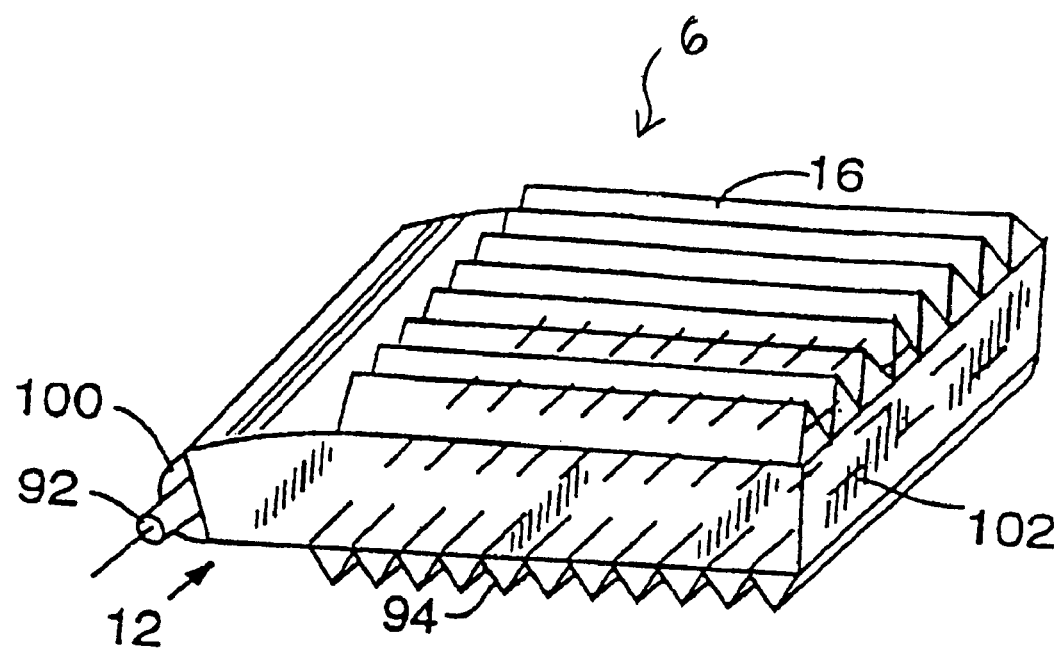
FIG. 1 illustrates a light source that can run on low power efficiently.

Each of the preferred embodiments and alternatives thereof comprises a light source consisting of a light pipe providing semi-collimated light or a collimated light source. FIG. 1, illustrating an embodiment of such a light pipe, shows a backlighting assembly system using a linear light source such as a cold cathode fluorescent lamp (CCFL) 92. In this situation, a beam expander 6 has a width approximately equal to the width of the platen of the fingerprint capture device. The beam expander 6 expands the linear light source into a plane light source. As shown in FIG. 1, a mirror reflector 100 is wrapped around the lamp 92 to collimate light in one dimension. Divergent angle rotating elongated microprism structure 16 is created on the top surface to rotate the light beams so that output light is collimated in both dimensions. Microprisms 94 located on the bottom surface are used to reflect light out. A side of the light pipe opposing the lamp is coated with a reflecting film 102 to reflect light back towards the microprism side and reflecting film 102 may be made to tilt towards the bottom surface so that essentially all of the light will be reflected out by the microprisms 94.

First Embodiment

Figure 2:
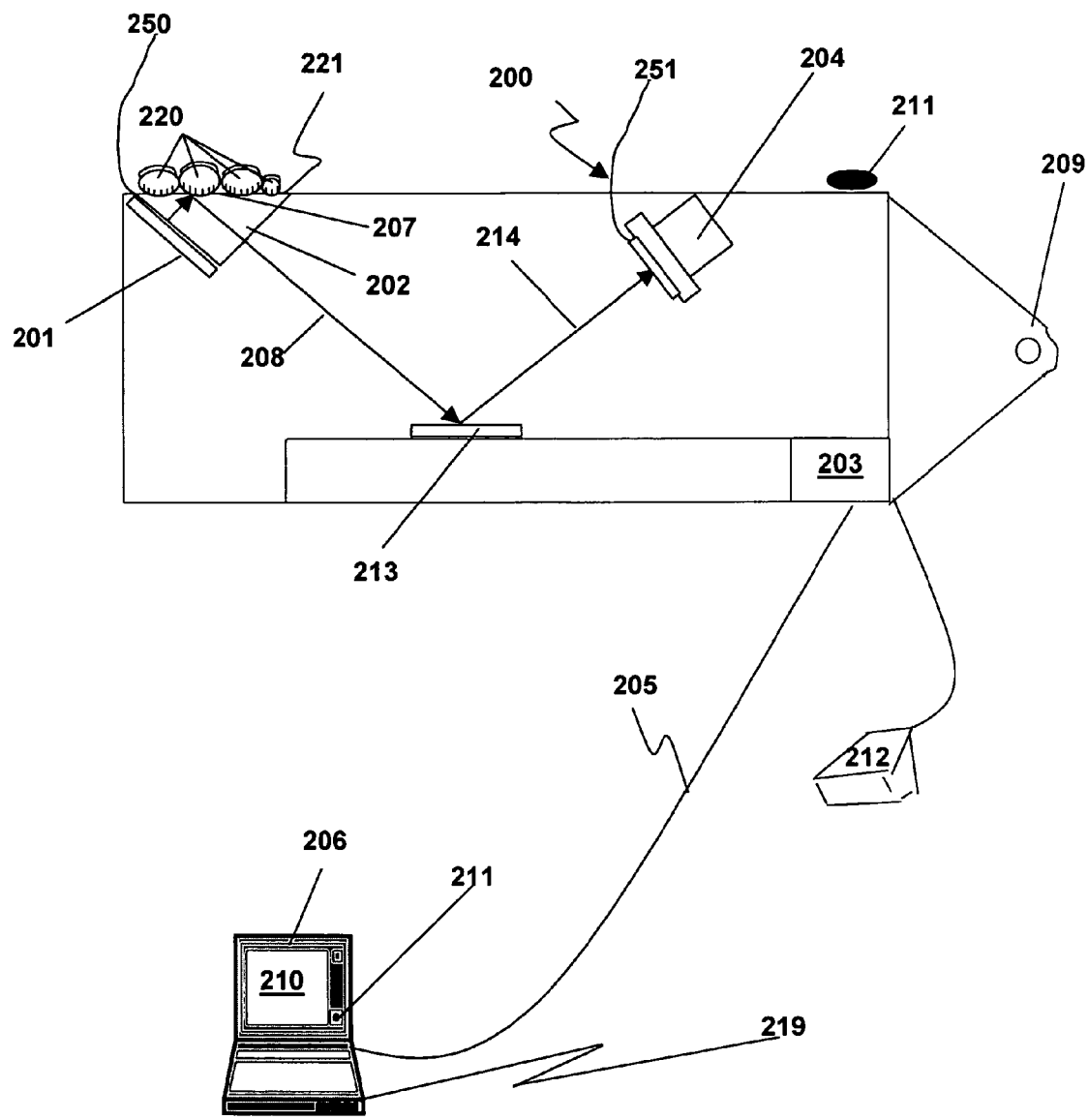
FIG. 2 illustrates a large format fingerprint device according to the present invention.

Referring now to FIG. 2, a first preferred embodiment of the present invention serves as a basic embodiment on which all other embodiments are founded. The first preferred embodiment has especially low power consumption, consuming at most between 3.0 and 10.0 watts, preferably at most about 2.5 watts, to lower battery drain on a host computer not connected to an electrical outlet.

As illustrated in FIG. 2, the first preferred embodiment includes a camera 204 having a lens and optionally a filter 251, an efficient light source 201 that consumes at most about 1 watt, preferably at most about 0.7 watt, and emits sufficient light for the camera 204 to obtain an acceptable image, a prism 202, an optional light control film 250 interposed between said light source 201 and said prism 202, and an interface 205 to a host computer 206. In this first preferred embodiment, light emitted by the efficient light source 201 enters the prism 202, is controlled by the light control film 250 and intersects the prism surface (platen) 207 at an angle greater than the critical angle. Light intersecting the fingerprint ridges 220 is scattered or absorbed while light that hits surface 207 of the prism with no ridges present is reflected. The reflected light then exits the prism 202 in a direction 208 towards an optional mirror 213 that reflects the light along optical axis 214 in a direction towards the camera 204 and optionally the filter 251. The optional mirror 213 is typically a precision dichroic mirror so that the mirror can additionally help remove ambient light that enters the system. The filer 251 substantially blocks ambient light from entering the camera. For example, if light source 201 emits a green light then mirror 213 and filter 251 pass only green light. Likewise, if light source 201 emits a red light then mirror 213 and filter 251 pass only red light. Alternatively, filter 251 can also filter infrared light. Some of the scattered light may also exit the prism in a direction of the mirror 213. The camera 204 captures a frame and transmits the frame to the host computer 206. Typical lenses for the camera have an f-stop of 3.0 to 8.5.

In each of the embodiments of the present invention, typically, an external stimulus causes a device according to the present invention to turn on the light source 201 before beginning fingerprint capture and turn off the light source 201 after the host computer is done interacting with the device. The preferred manner to control the light is via a software control from the host computer 206. This host computer 206 directs the device to change a switch that allows or disallows electricity to flow to the light thereby turning the light on and off.

In each of the embodiments of the present invention, a record of counts and other data is typically maintained in a non-volatile memory 203 that is located in the camera 204 electronics or elsewhere on the device. These counts are used to track the need for system maintenance. Such counts include, but are not limited to, amount of time the light source is on, the number of each type of fingerprint captured or rescanned, the number of times the light source was switched on, the number of times the light source was switched off, and the number of times the device detected that the light was off when it should have been on. Other data stored typically includes the device serial number, manufactured date, manufactured location, date and time latest used, and driver software version number. A diagnostic software or firmware component typically interrogates these counts in the non-volatile memory 203 to determine if the counts indicate device maintenance is needed. This diagnostic component, in an alternative embodiment, is also configured to perform tests to identify possible system errors. This diagnostic component outputs a diagnostic report based on the test results and the values of the counts. The diagnostic report can be viewed and browsed on a screen 210 of an attached host computer 206 or can be printed and, in any event, can be stored in a persistent storage (not shown) by the host computer 206.

The efficient light source 201 is preferably a CCFL using a light pipe (dimensionally flat, high and uniform output) or alternatively and LED or other source providing a semi-collimated light source as adapted from the teachings of U.S. Pat. Nos. 5,359,691, 5,390,276, and 5,854,872 and other collimated light sources. The patents teach light sources that inject light into the side of a light pipe. Microstructures within the light pipe and the light guide connecting the light source to the light pipe redirect the incident light into predefined directions. The arrangement and geometry of the microstructures enable the light pipe to output light from the light pipe surface in a substantially collimated fashion. The conical angles at which light leaves the surface of the light pipe are predetermined by the arrangement and geometry of the microstructures. The microstructures are typically microprisms. The light pipe configuration used for the present invention optionally also includes a filter to restrict light emanating from the filter surface to primarily semi-collimated light in a cone that diverges from the normal to the surface of the light pipe by approximately 30 degrees in each direction.

In an alternative embodiment an automatic feedback loop is used to control light source intensity 201 since light output varies over time. This feedback loop is implemented by at least one of an optoelectronic feedback loop for controlling input power to the light source 201 and a device-resident or host computer 206 resident software for adjusting the exposure time of the camera 204. For instance, Microsemi, 2381 Morse Avenue, Irvine, Calif. 92614, sells silicon chips that can easily be incorporated into an optoelectronic light feedback loop.

The apparatus, system and method of the present invention preferably captures fingerprints using image processing operations as trigger conditions. For example, placing fingers of the subject on the platen could start a capture sequence, and the subject removing contact with the platen could end the capture sequence or when a substantially similar image occurs more than a pre-determined number of times could end the capture sequence.

Alternative embodiments use foot pedals 212, buttons 211, keyboard keys (not shown), or touch screens 210. Image detection and capture processing operations are implemented in at least one of software, firmware, a dedicated circuit or a functionally dedicated chip. These operations are implemented on at least one of the host computer 206, a network computing resource 219, a frame grabber (not shown) that captures the frames, or within the device itself 200.

In preferred embodiments of the present invention, the interface 205 to the host computer 206 is a single tether 205 that handles data, control, and power for the light source 201, camera 204, platen heater, platen blower, and optional devices. Optional devices include a barcode reader 501 and a magnetic stripe reader 601. In preferred embodiments, the interface comprises at least one of USB (USB-2) connection or FireWire and their variants or other interface for exchanging data and conveying power to operate. If the device of the present invention is plugged into an external power source (not shown) such as a wall outlet or an internal or external battery power source (not shown), the interface may include Ethernet and its variants as well as optical fiber, suitable to enable high resolution images to be captured and transmitted for processing over the tether 205. Essentially, the interface can be any that provides the interconnectivity between the capture device of the present invention and a target system that performs at least one of receipt of captured images, and processing of received images.

A protective covering (not shown) is provided which comprises one of a coating placed directly onto the device, a coating placed directly onto the device combined with a removable cover, and a lightweight snap-on carrying case that the device easily slips into and out of.

For a higher resolution camera such that scanning can be performed at least at 500 dpi and 1000 dpi, the images captured can include at least one of a single digit, up to 8 digits simultaneously, a palm print, a writer's edge, and all the slaps and rolls and footprints and nose prints required of an apparatus, system and method according to the present invention.

In each of the embodiments, camera lenses 204 may introduce imaging defects such as barrel and pincushion distortion. The present invention may employ a suitable correction algorithm such as a correction algorithm substantially similar to that published by Ojanen, the entire contents of which are hereby incorporated by reference, or other suitable correction algorithm. A pre-print describing this Ojanen algorithm and software that implements this algorithm may be found at http://www.math.rutgers.edu/~ojanen/ and is included in Appendix A. The first step in applying the algorithm is to scan a reference target on the device, which contains multiple geometric elements of known size and spacing with respect to one another. The size and spacing of these geometric elements is designed to capture barrel and pincushion distortions. For example, a rectangular array of circles measuring 0.5 mm in diameter and spaced 2.5 mm apart is used. Once the image of the target has been captured, the software attempts to automatically locate the geometric elements in the image and attempts to form a rectangular array of these elements. After a complete array of the geometric elements is identified, the software uses the known distance between elements, the size of the elements, and the center of the element array to measure differences (error terms) between the expected position of the elements and the actual position of the elements. These errors terms are used with a selected defect model to approximate the coefficients in the defect model using a least squares type of algorithm. The output coefficients and the defect model are then used to correct a captured image using the Ojanen method. Correction in the image occurs after the final roll or slap has been captured.

Preferably, perspective distortion, if present, would be compensated for optically, by firmware, by hardware or by software.

Second Embodiment

Figure 3A:
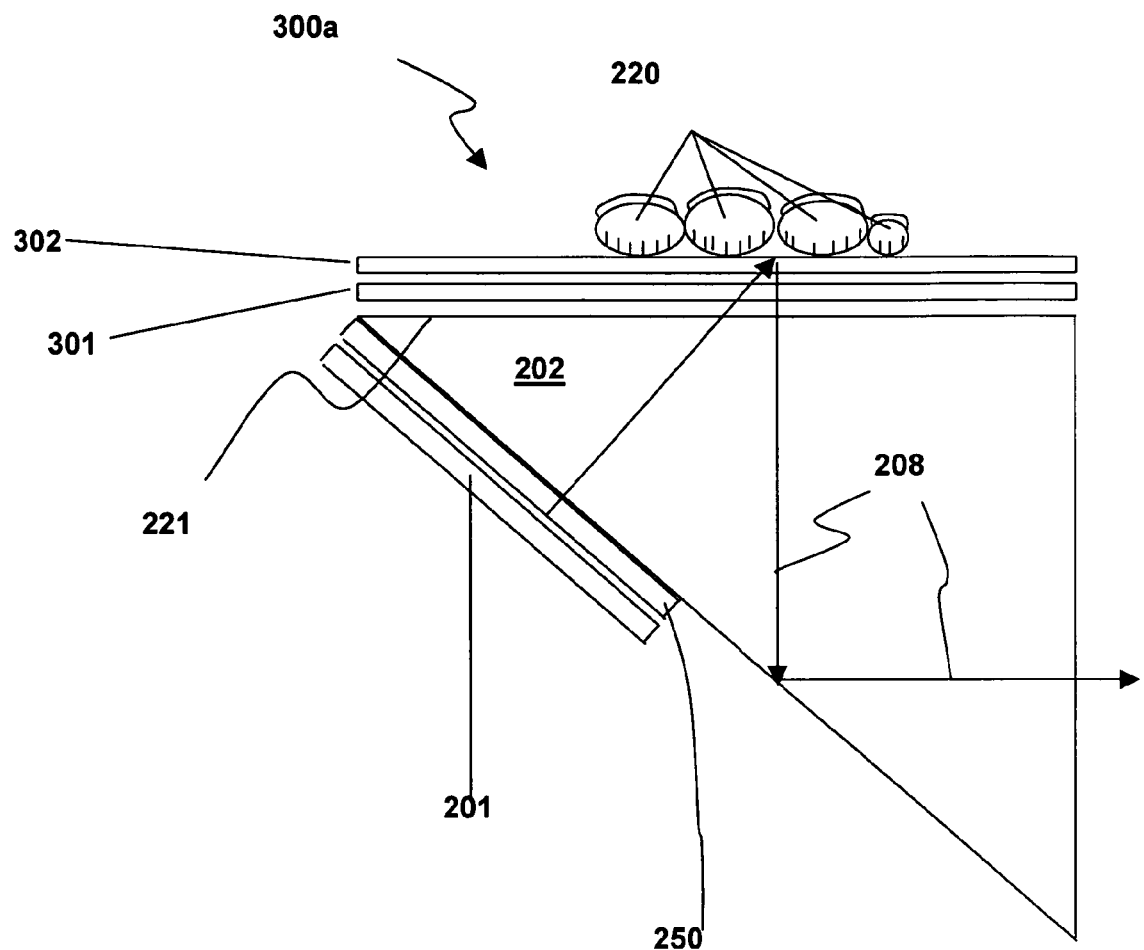
FIGS. 3A-B illustrate a large format fingerprint device in which a holographic grating has been incorporated according to an embodiment of the present invention.
Figure 3B:
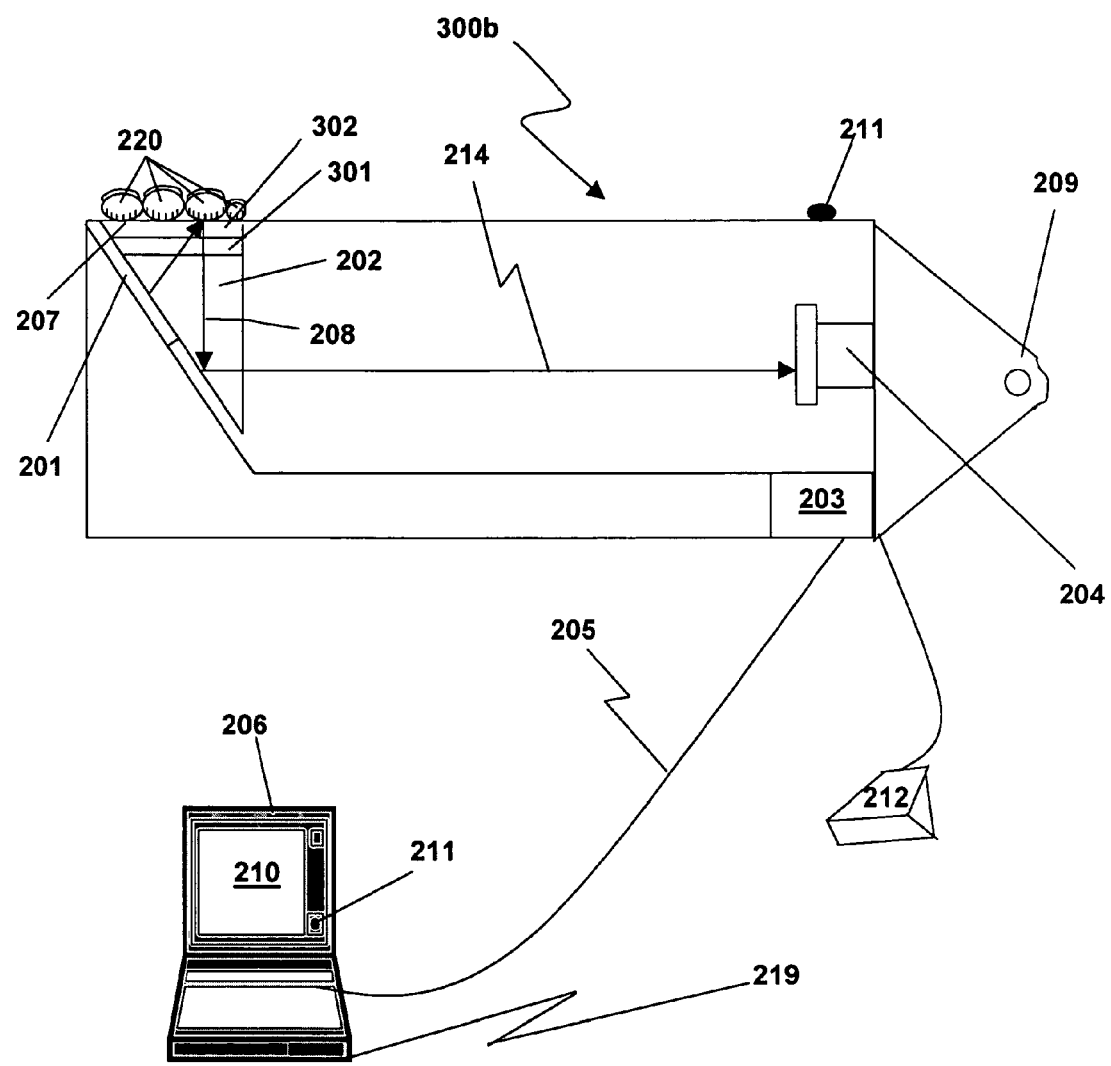

Referring now to FIGS. 3A-B, a second preferred embodiment of the present invention includes an efficient light source 201, a prism 202, a holographic grating 301 on an upper surface of the prism 202 and a light-transmitting substrate 302 on the holographic grating 301, a camera 204 having a lens, and an interface 205 to a host computer 206, and the host computer 206. The holographic grating 301, light transmitting substrate 302 and the upper surface 221 of the prism 202 together form a platen. Optionally, the holographic grating 301 is attached by an adhesive to the upper surface 221 of the prism 202 and to the lower surface of the light transmitting substrate 302 by an adhesive (not shown). Typically the holographic grating 301, light transmitting substrate 302 and the prism 202 are made of glass or acrylic polymer. In this second preferred embodiment, light emitted by the efficient light source 201 (light pipe) enters the prism 202 intersecting the prism surface 221 at an angle greater than the critical angle. Then, the light passes through a holographic grating 301 and the light transmitting substrate 302 on the surface of the prism 202, hits the finger ridges 220, and is scattered/absorbed or hits the surface of the substrate 302 and is reflected 208. Reflected light 208 passes back through the holographic grating 301 and is corrected on its way back through the holographic grating 301. The scattered and reflected light then is further reflected by a surface of the prism 202 and exits the prism 202 in the direction 208 of the camera 204. The camera 204 captures a frame and transmits the frame to the host computer 206.

In a preferred alternative of the second embodiment, the holographic grating 301 is adapted from the teaching of U.S. Pat. No. 5,629,764. The holographic grating 301 allows the size of the system to be reduced since the depth of field requirement is now near zero. This translates into a lower f-stop and lower focal length lens, which in turn translates into a shorter, required optical path length. In other words, the holographic grating 301 is significantly advantageous to the compactness (and portability) of the present invention.

An additional alternative to the second preferred embodiment and the above-mentioned alternative employs a holographic optical element (HOE) with a lensing function. Such an HOE serves a very similar function to the holographic grating 301 but, in addition, it has a focusing ability built in so that part of the function of the lens can be off-loaded onto the HOE. The net result in this additional alternative to both preferred second embodiments is that the optical path length can be made even shorter than with the holographic grating 301 since the lens 204 can be closer to the prism 202.

Third Embodiment

Figure 4:
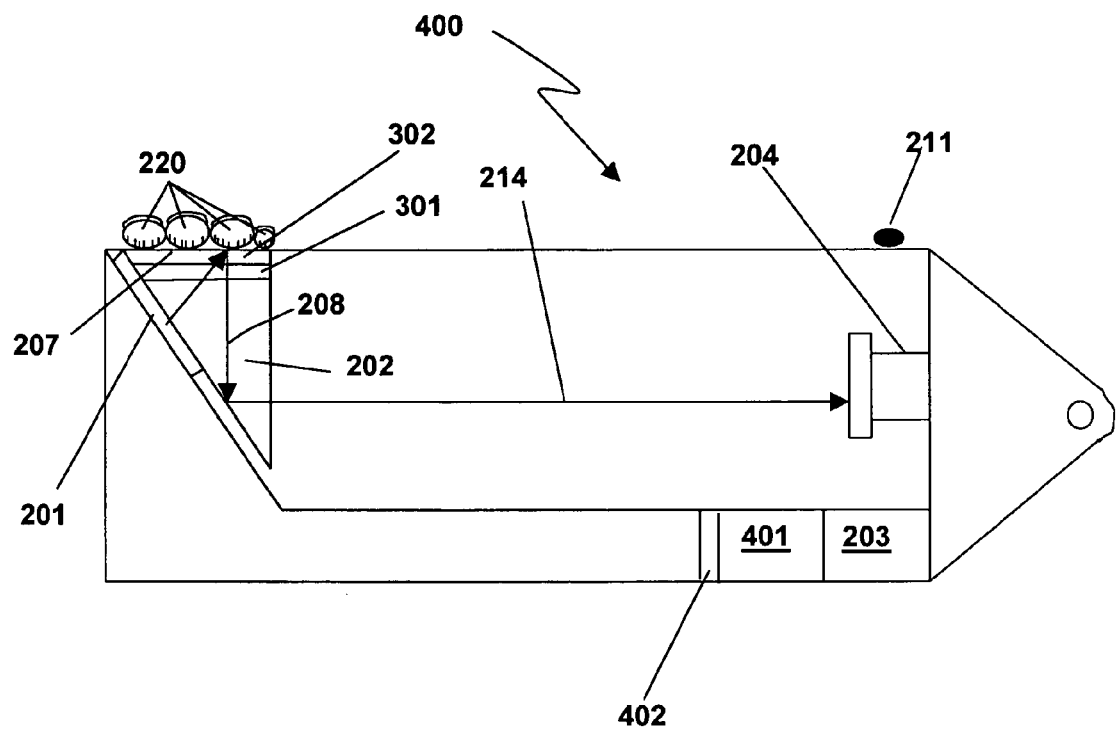
FIG. 4 illustrates a large format fingerprint device with either a battery subsystem or a capacitor that powers the electrical consumers of the device, according to an embodiment of the present invention.

The embodiment illustrated in FIG. 4 is substantially similar to that of FIG. 3B but shows a power subsystem 401 based upon a Lithium ion battery 402. In this subsystem, a Microsemi LX2201 chip, or similar chip, can be effectively used to provide power to the electrical consumers in the system. If enough power enters the system through the tether 205, this power is directed to the appropriate electronic components using a switching implementation driven by software and firmware resident on the device 400. Extra power not used by the devices is used to charge the battery 402 under the control of the software, firmware, or hardware.

In an alternative embodiment a capacitor 402 or a solar cell (not shown) replaces the Lithium ion battery 402. Such a construction can be used when a power shortage is temporary and can be served by the capacity of the capacitor being used.

Fourth Embodiment

Figure 5A:
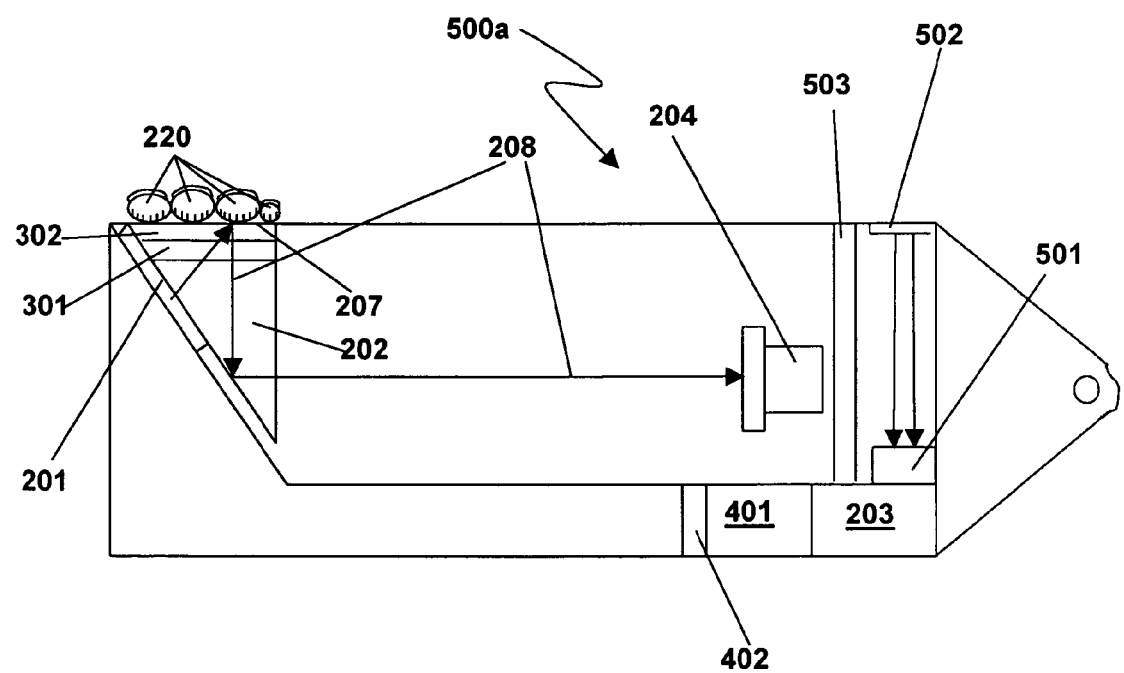
FIGS. 5A and 5B illustrate a large format fingerprint device incorporating a two-dimensional barcode reader with imaging capability, according to alternative embodiments of the present invention.

FIG. 5A illustrates a built-in barcode reader 501 that is a second image capturing device in the camera. The window 502 through which the barcode reader images documents (driver's licenses for instance) is placed so that ambient light that may enter the system through the window does not interfere with the fingerprint image being captured by the camera 204. This can be done several ways. In the preferred embodiment, the window 502 is placed in a location behind a light blocker 503 that physically prohibits the light from disturbing the fingerprint image. In FIG. 5A such a location is behind the camera 204 that captures the fingerprint image. In an alternative embodiment, since the barcode and fingerprints are not typically captured simultaneously, a covering (not shown) is designed into the case so that the window 502 is covered when not in operation. For example (not shown), the case may provide parallel grooves flanking the window and a sliding cover is slidably located in said grooves. The grooves are sufficiently long such that the cover may slide from a first position which fully covers the window to a second position which fully exposes the window.

The power for the barcode reader 501 is tapped off of the power subsystem 401. The 4100 unit from Hand Held Products, Inc. (HHP), 700 Visions Drive, Skaneateles Falls, N.Y., 13153-0208, is an example of a suitable reader. Since the barcode reader 501 and the fingerprint imager 204 are not operating at the same time, full power is only provided to one device at a time. The control logic that interfaces to the camera 204 and the barcode reader 401 is written as firmware, in a preferred embodiment. This firmware communicates with the camera 204 and the barcode reader 401 in their native formats. For instance, the HHP barcode reader mentioned above communicates with a serial interface that is implemented on a Silicon Imaging camera. The firmware within the camera 204 manages this serial interface to control the barcode reader 501. An external interface to the barcode reader 501 on the host computer 206 simply talks to the firmware, which talks with the barcode reader 501.

Figure 5B:
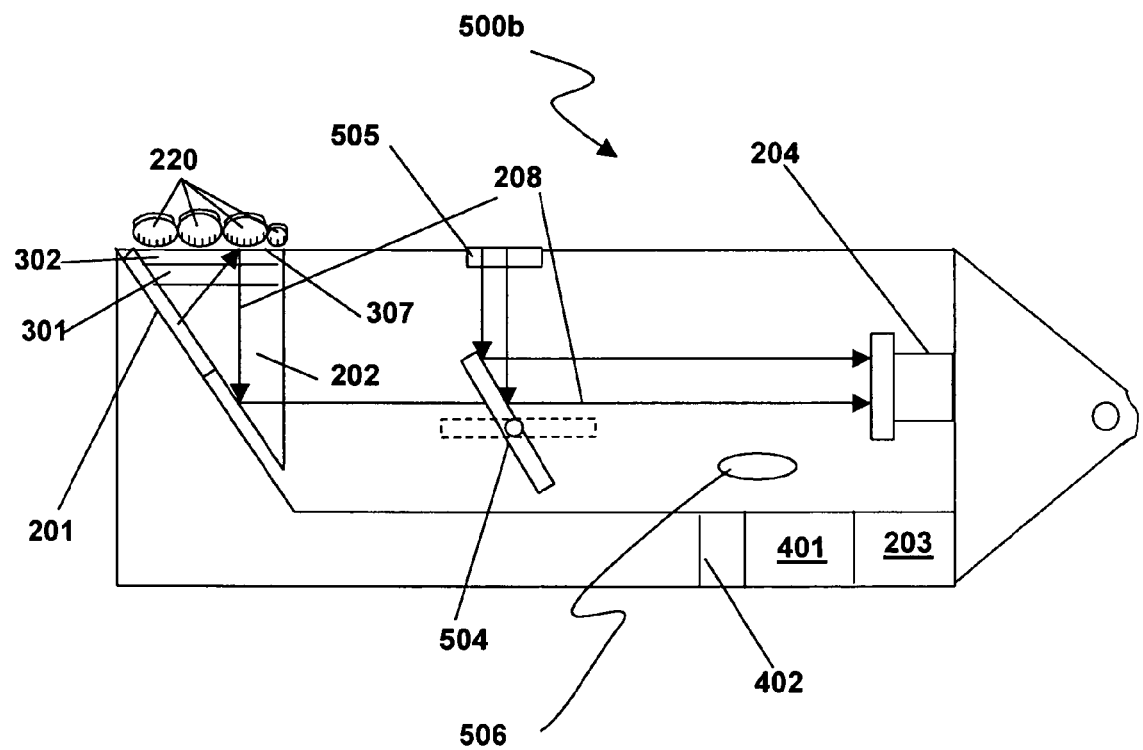

FIG. 5B is an alternative embodiment of the barcode embodiment in which a movable mirror 504 is used to redirect the optical path of the fingerprint-capturing camera 204 through a secondary window 505. When the mirror 504 is moved, manually or otherwise, into the appropriate position the camera 304 can begin capturing images of scenes through the secondary window 204. Captured images may be processed on the host computer 206 with any number of barcode reading software packages. After the barcode is read via this software, the mirror 504 is placed back into its original position and the operator can begin to capture fingerprints. In this embodiment, only a single camera 204 is being used but a second light source 506 must be provided. Such a light source can include LEDs or CCFL and the power to the second light source 506 can be controlled as described above in the light pipe 201.

Fifth Embodiment

Figure 6:
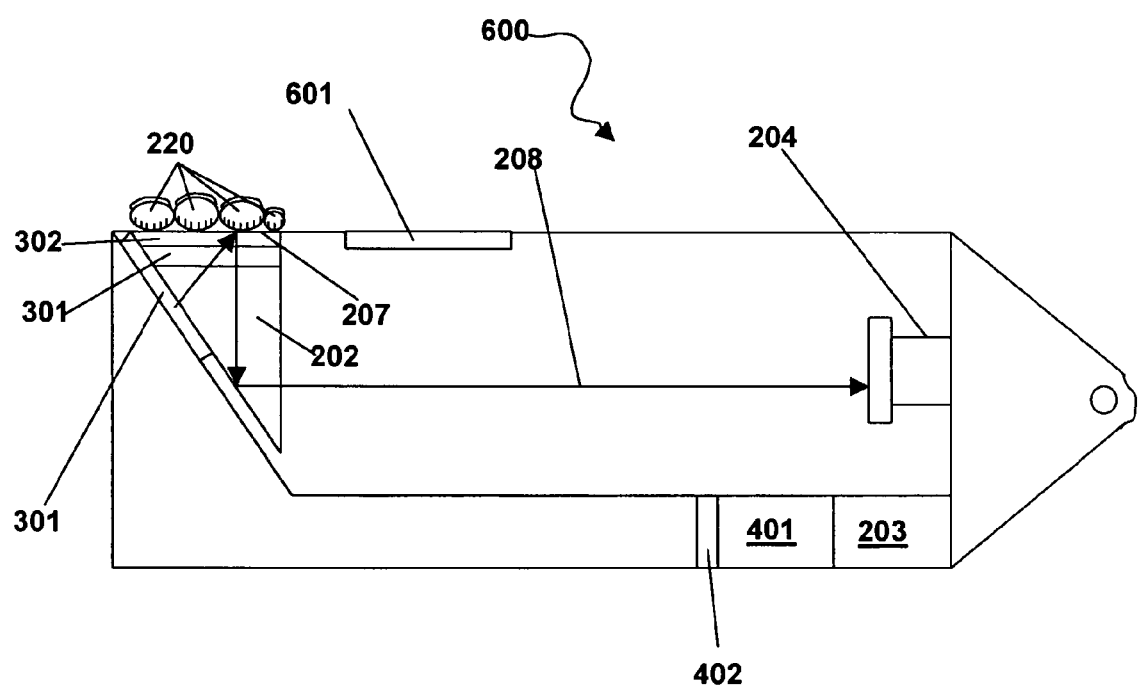
FIG. 6 illustrates a large format fingerprint device incorporating a magnetic stripe reader, according to an embodiment of the present invention.

In a fifth preferred embodiment, illustrated in FIG. 6, a magnetic stripe reader 601 is included in the device. Since these readers are typically low power consumers and non-optical in nature, the magnetic stripe reader 601 can be placed in any location that does not interfere with fingerprint capture. The magnetic stripe reader 601 draws power from the power source 401 much as the barcode reader 501 and light source 201 do. The magnetic stripe reader 601 also has the option of being turned on and off in software. Applications of the magnetic stripe reader 601 include fraud prevention since a credit card can be scanned and fingerprints verified at the same time. Also, driver's licenses that encode demographic data in the magnetic stripe can be read.

Sixth Embodiment

Figure 7:
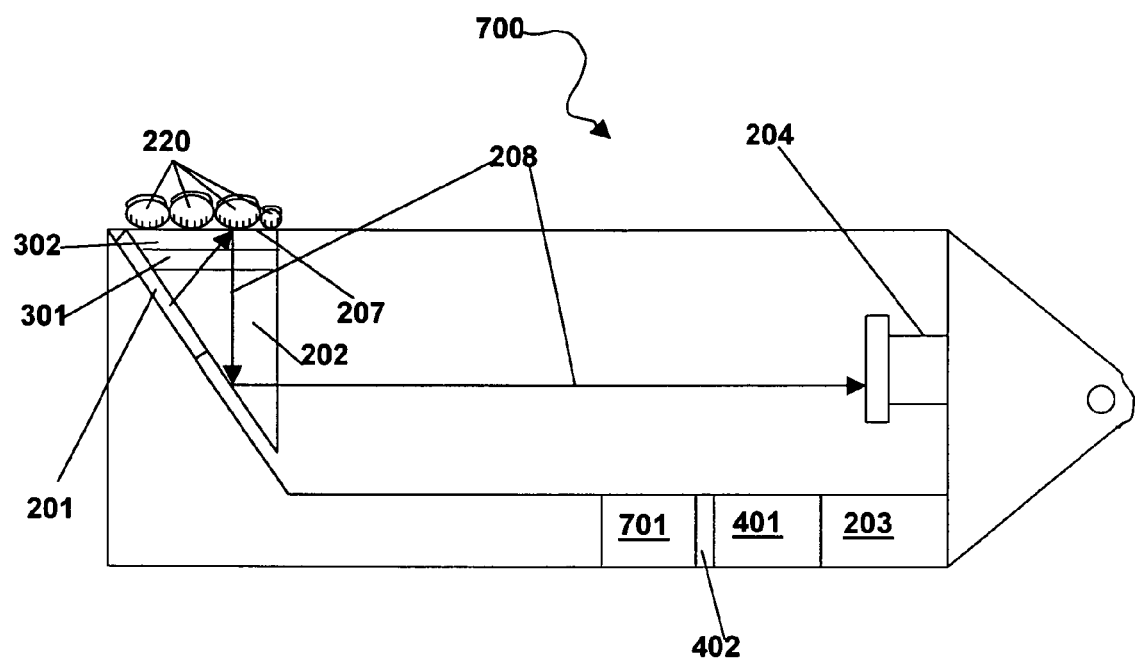
FIG. 7 illustrates an embodiment of the present invention comprising a device-resident computer processor and a device-resident non-volatile memory.
Figure 8A:
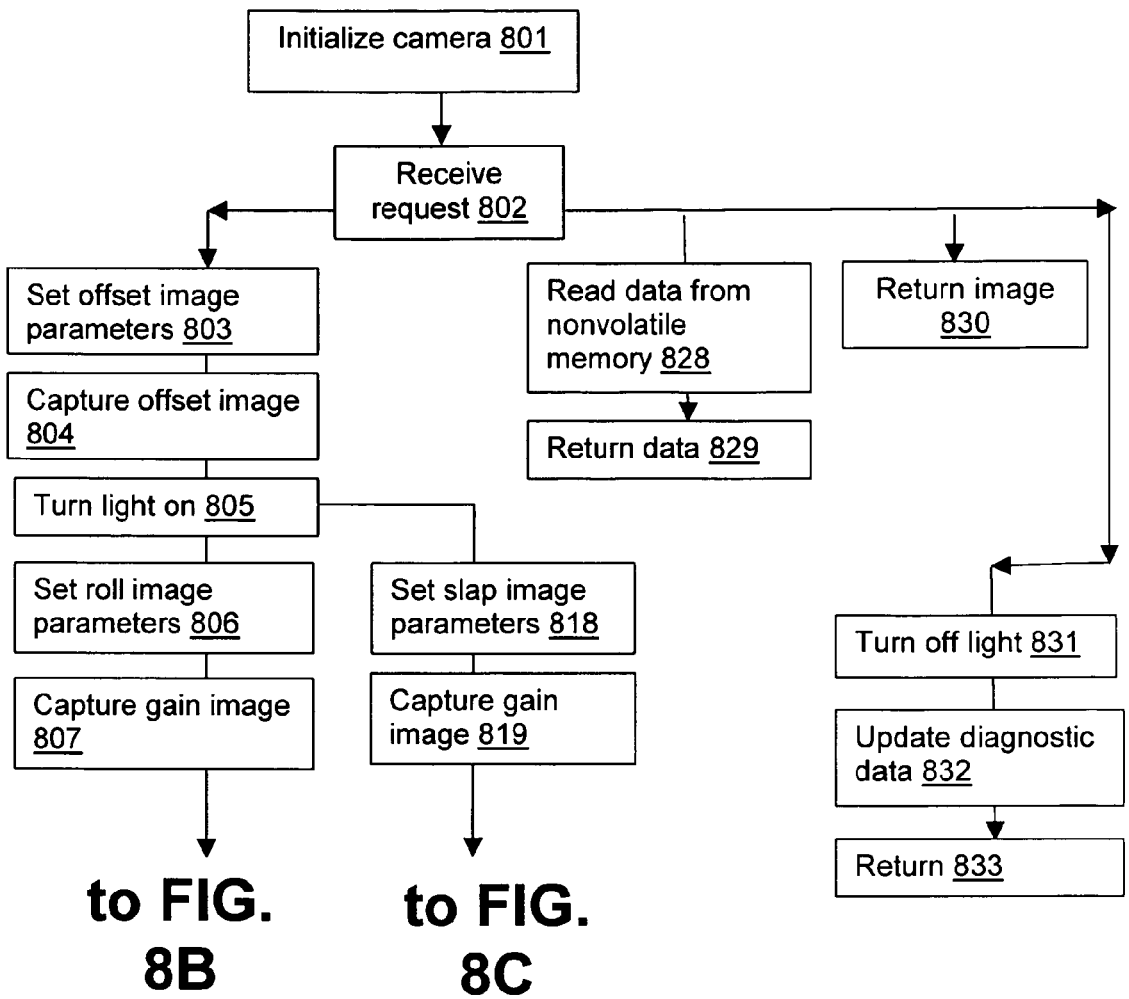
FIGS. 8A-D are a flow diagram of the method of the present invention.
Figure 8B:
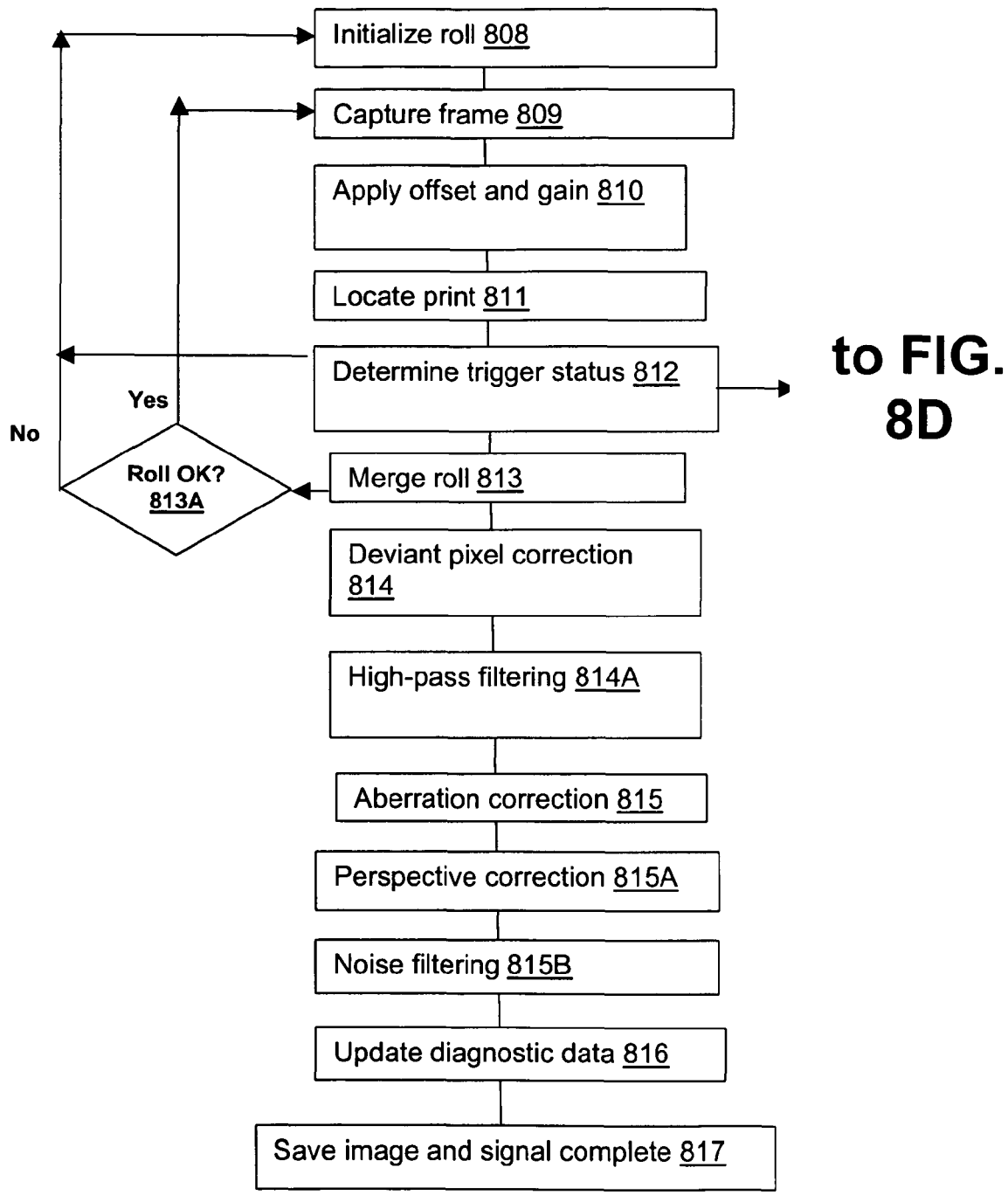
Figure 8C:
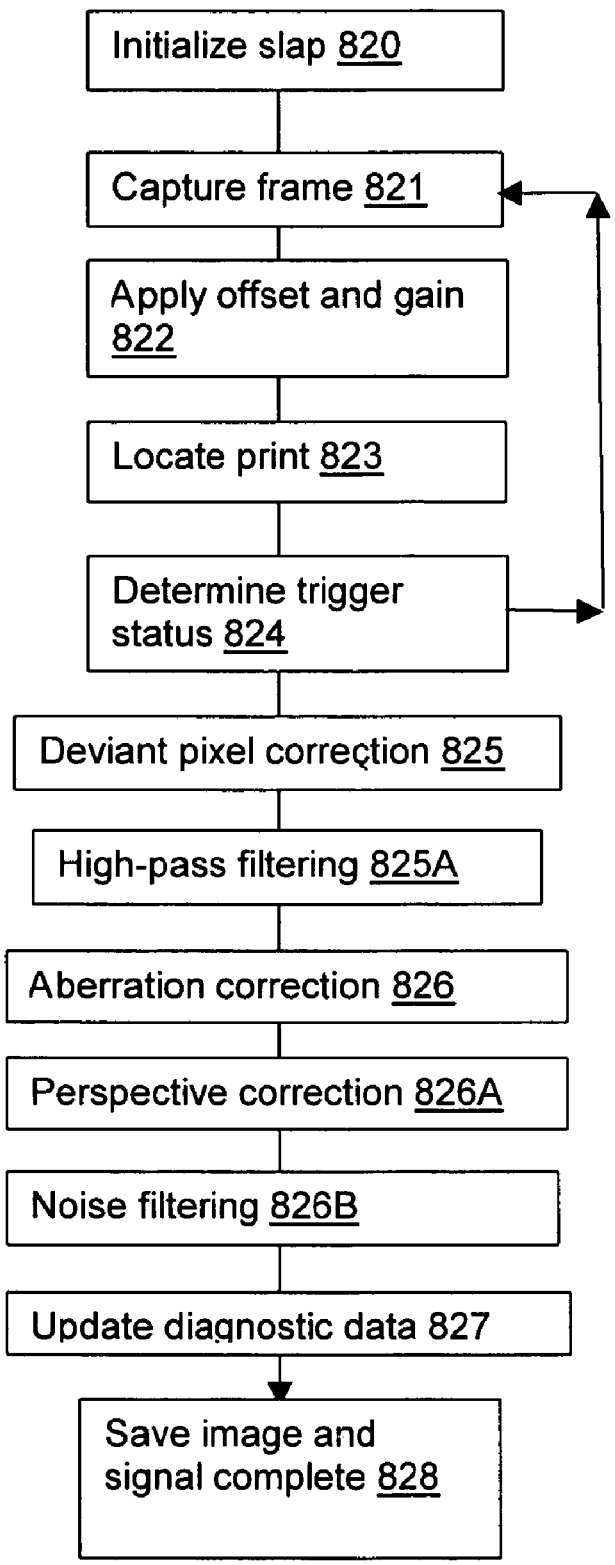
Figure 8D:
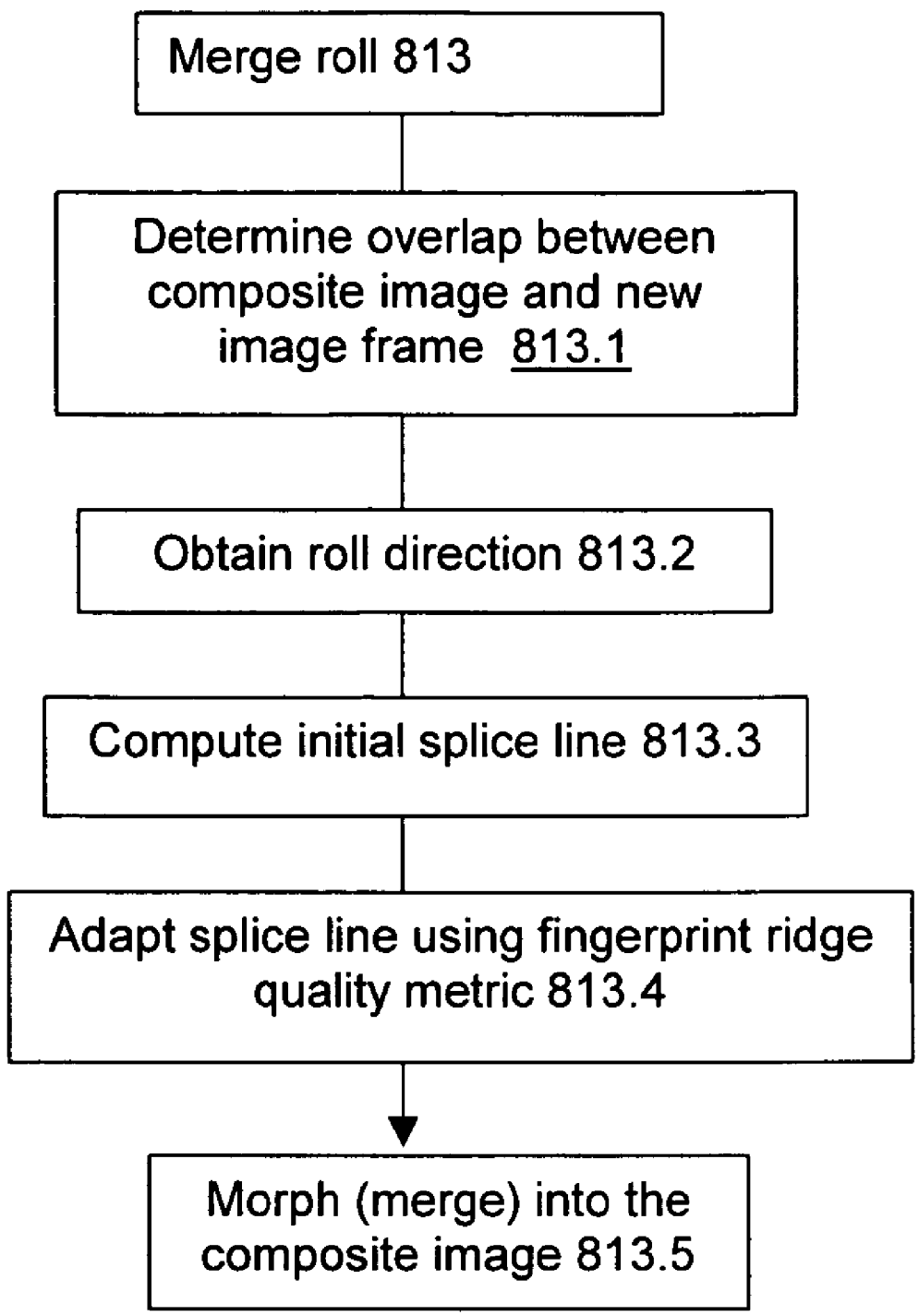

In a sixth preferred embodiment, illustrated in FIG. 7, the present invention further comprises at least one of a device-resident computer processor 701 and a device-resident non-volatile memory 203 for storing minutiae used for matching. Network access 219 to this memory 203 is provided via the single tether 205 to the host computer 206 (see FIG. 2). This memory 203, combined with the on-board computing power in the device, allows for a standalone matching system that can be updated over the network via the tether.

Seventh Embodiment

In a seventh preferred embodiment, the device illustrated in FIG. 11 has a magnesium extruded case 1101. Inside of this case, a prism bracket 1103 holds the prism 1102 and light source 1104 so that the prism is flush with the surface of the case 1101 or extends slightly beyond the case. The prism bracket is loaded with the light source 1104 by placing the ears 1113 of the light source into the ear slots 1117 on the prism bracket 1103. After the light source has been placed, thin tabs (not shown) are screwed into tab holes 1118 so as to retain the light and permit the light constrained but free movement for expansion and contraction. After the tabs have been secured, the prism 1102 is slid into the prism bracket so that the prism is flush with the tabs and the retaining sill on the prism bracket. The completed prism bracket is slid onto the extrusion so that the radiused edge 1116 of the bracket fits into the scallop 1124 of the case 1101. The prism bracket is swung up into place using this hinge joint and the prism bracket is fastened to the case 1101 using machine screws (not shown) in holes 1115, The camera bracket 1122 has the lens threaded into the through hole 1123. A board level camera is secured in place onto camera bracket 1122 on the opposite side of the lens and the entire camera bracket assembly is mounted onto the camera mount 1121 by screwing the camera bracket to the camera mount through adjustment slot 1120. The inverter required for the light pipe can be mounted on the front side of camera mount 1119 as well. After the physical connection 1106 and the dichroic mirror 1107 have been mounted, the electrical connections within the system are completed and adjustments for the locations of the components are made so as to ensure the camera is capturing the platen area properly.

In operation, light originating at the light source 1104 enters the prism 1102 and intersects the platen surface. Light, which totally internally reflects is directed toward the camera around the optical axis 1105. The light intersects a dichroic mirror 1107 and reflects toward the camera lens 1108. The light is then capture by the image sensor 1109 on the camera unit 1110 and digitized as an image. Images captured by the camera 1110 are transmitted over the connection 1106 to an attached computer.

Eighth Embodiment

Figure 12:
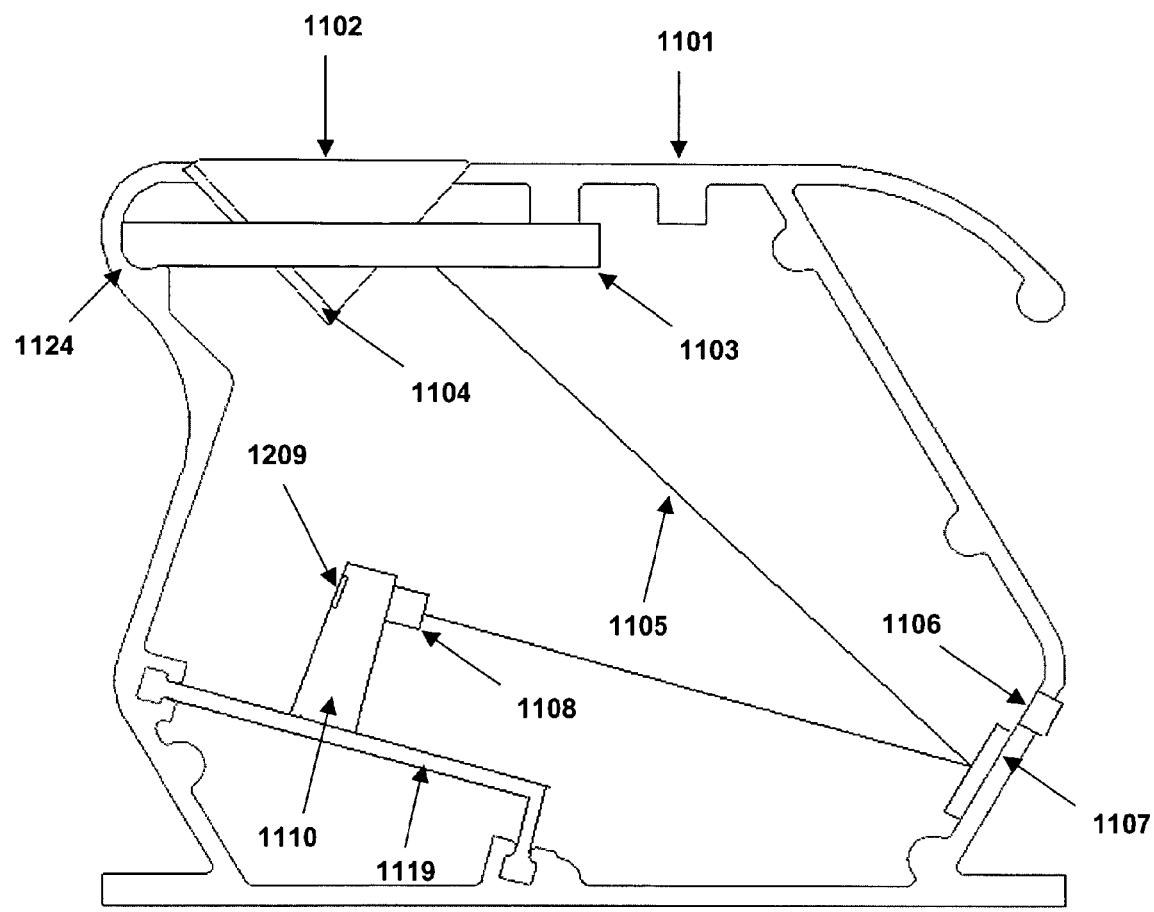
FIG. 12 illustrates an alternative preferred compact embodiment of the device based upon the device in FIG. 11.
Figure 13:
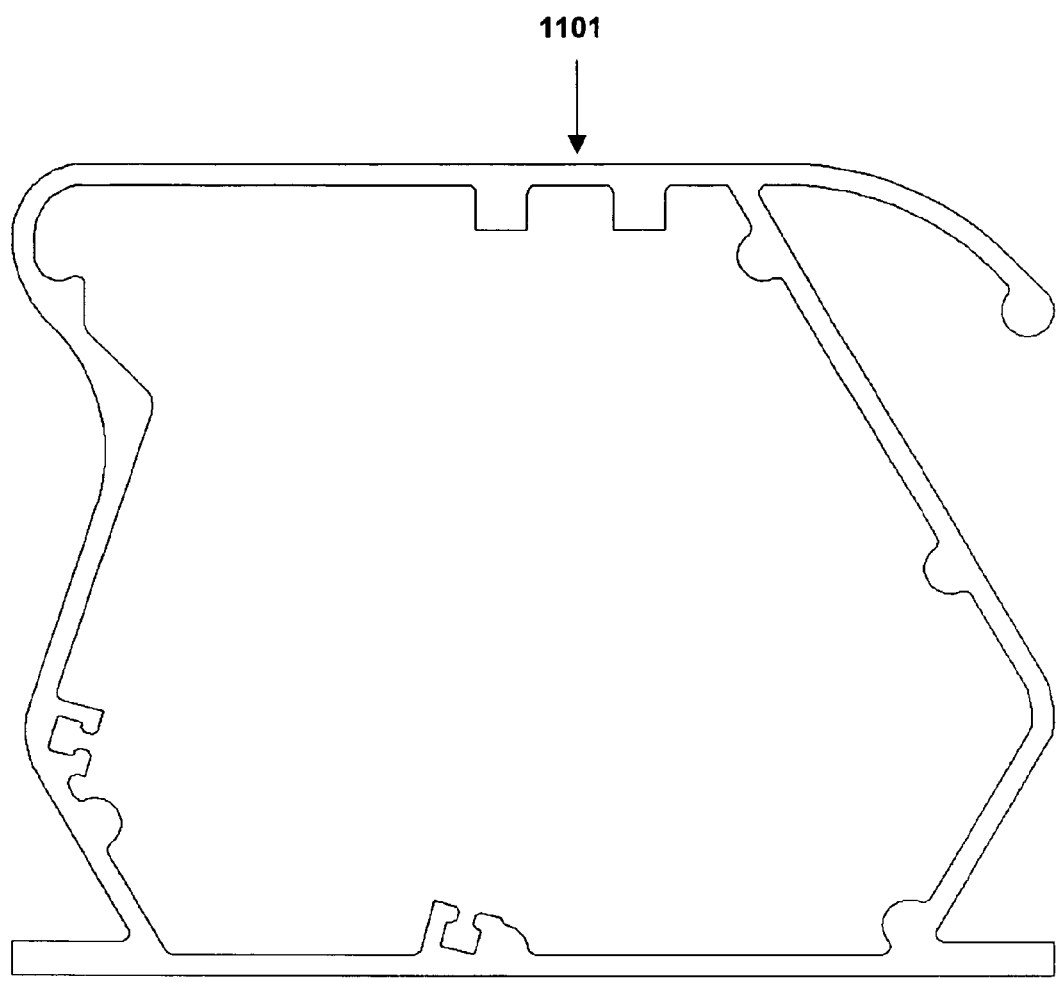
FIG. 13 illustrates a possible case for the device which can be generated using an extrusion.

In an eighth preferred embodiment, the device illustrated in FIG. 12 can have the image sensor 1209 mounted at an angle that has been calculated to minimize the depth of field requirement. FIG. 12 is otherwise identical to FIG. 11. As illustrated in FIG. 12, the body of the lens 1108 remains parallel to the optical axis 1105 but, a board level camera 1110 on which the image sensor 1209 is mounted is rotated by about three degrees with respect to the perpendicular to the optical axis 1105. In a device with a lateral magnification ratio of 1/13, a prism angle of 45 degrees and a prism index of refraction of 1.52, the sensor 1209 should be placed at an angle of 2.89 degrees.

Slip-Case

Figure 9:
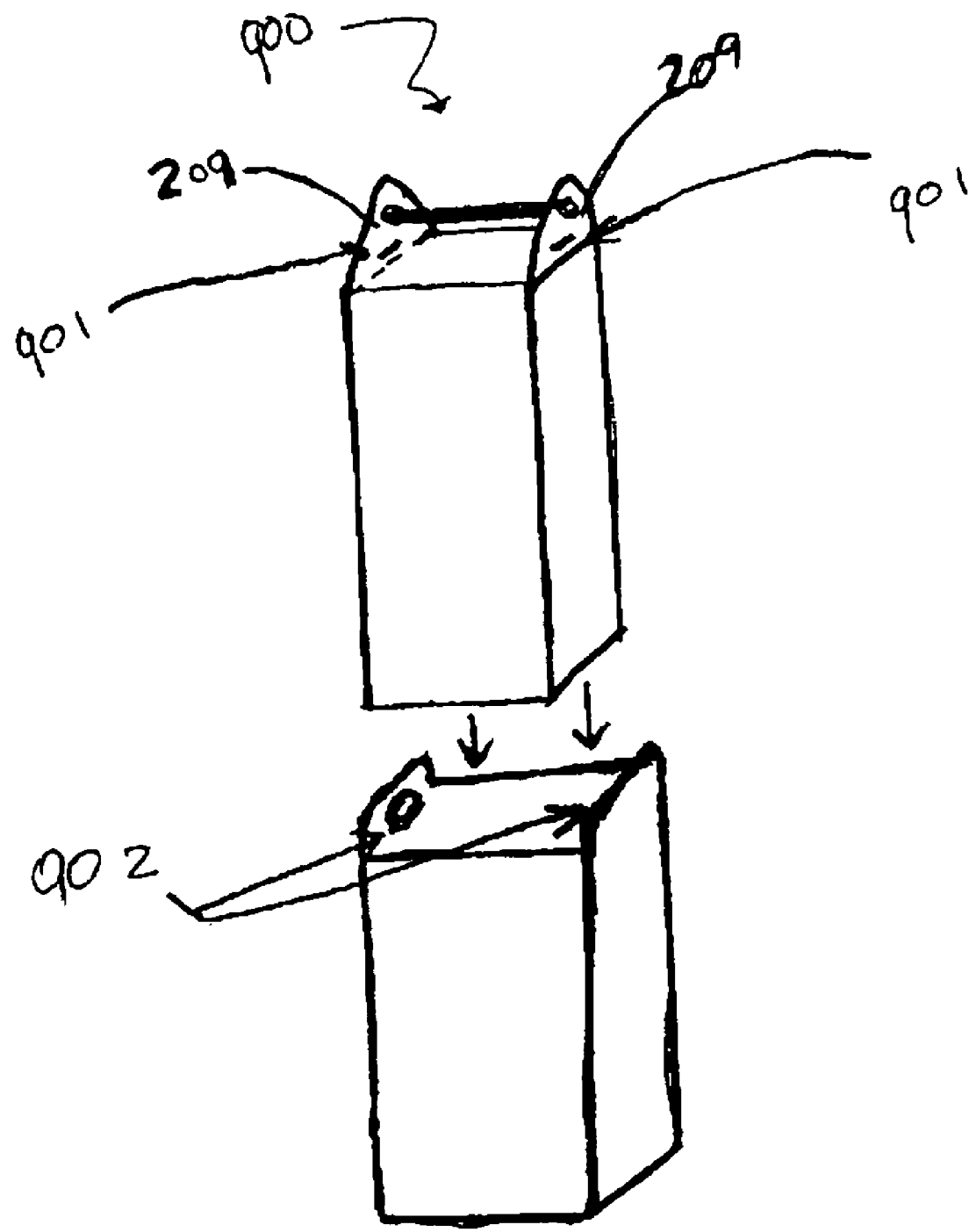
FIG. 9 illustrates a slip case for covering the device.
Figure 10A:
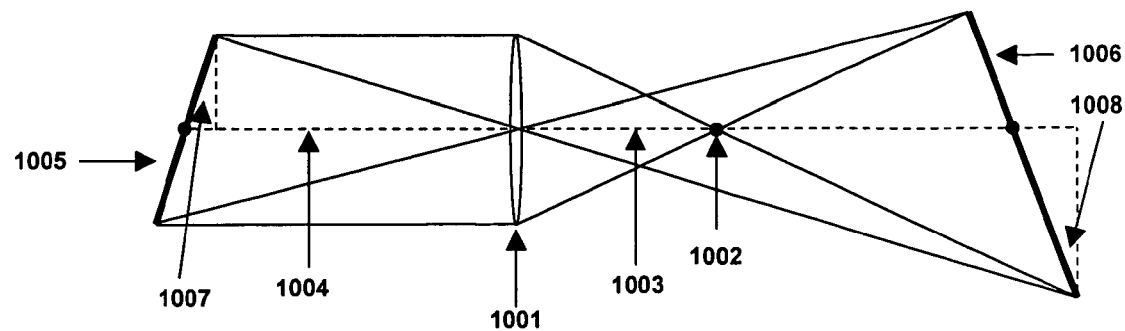
FIGS. 10A-B illustrate how changing the angle of the image sensor minimizes depth of field.
Figure 10B:
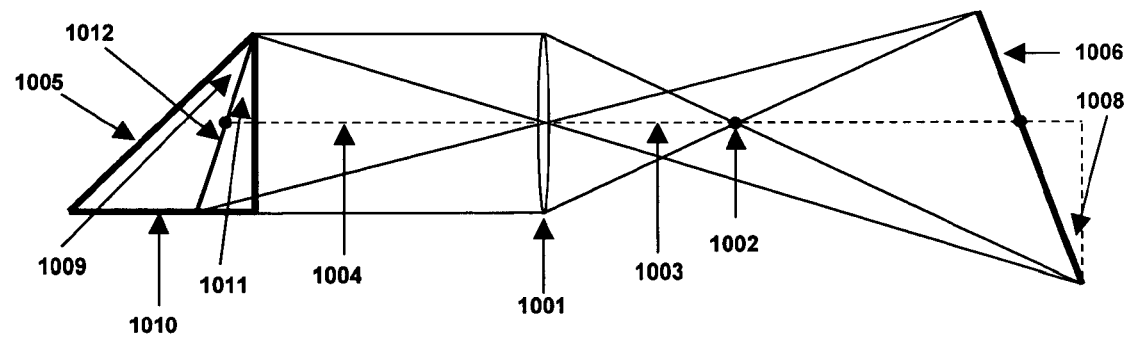
Figure 11A:
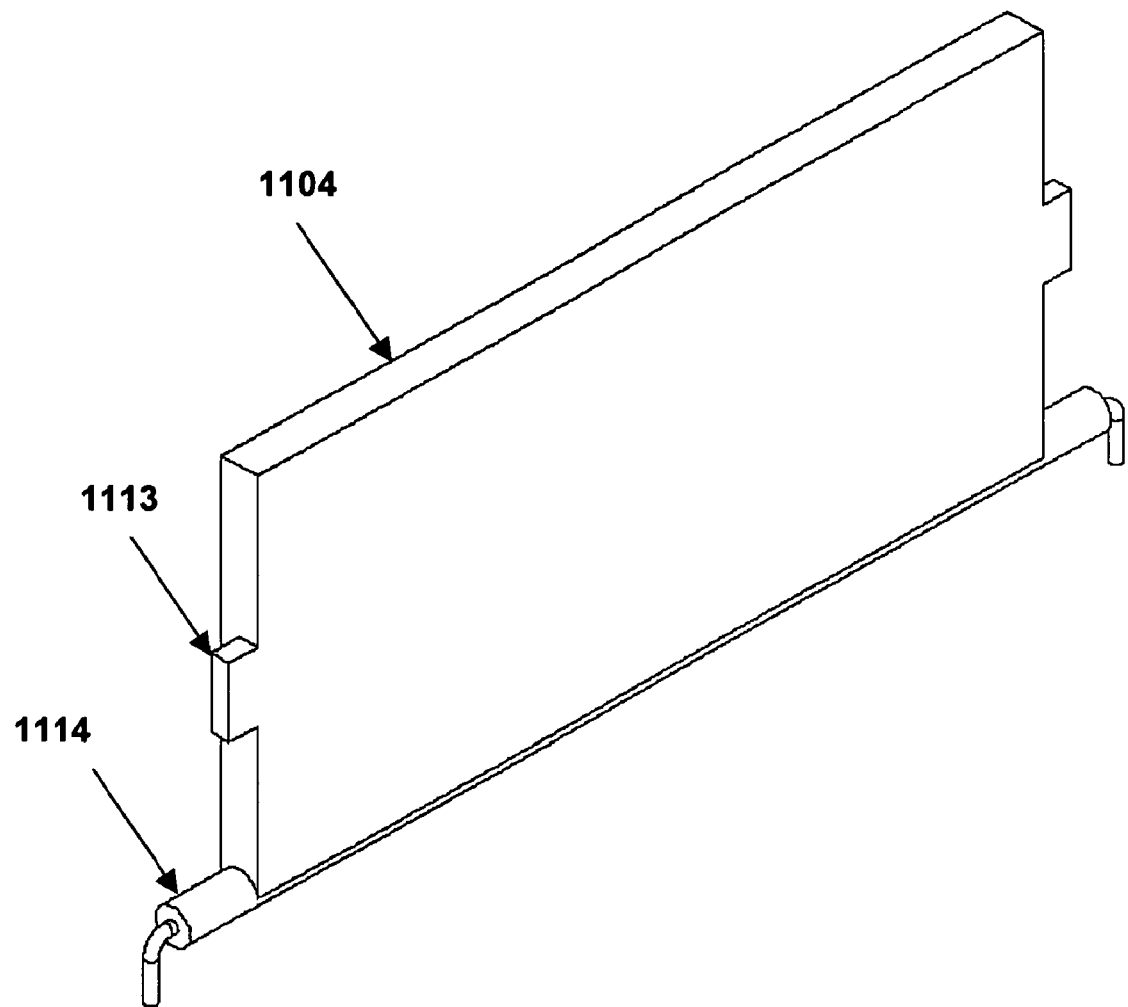
FIG. 11A-E illustrates a preferred compact embodiment of the device.
Figure 11B:
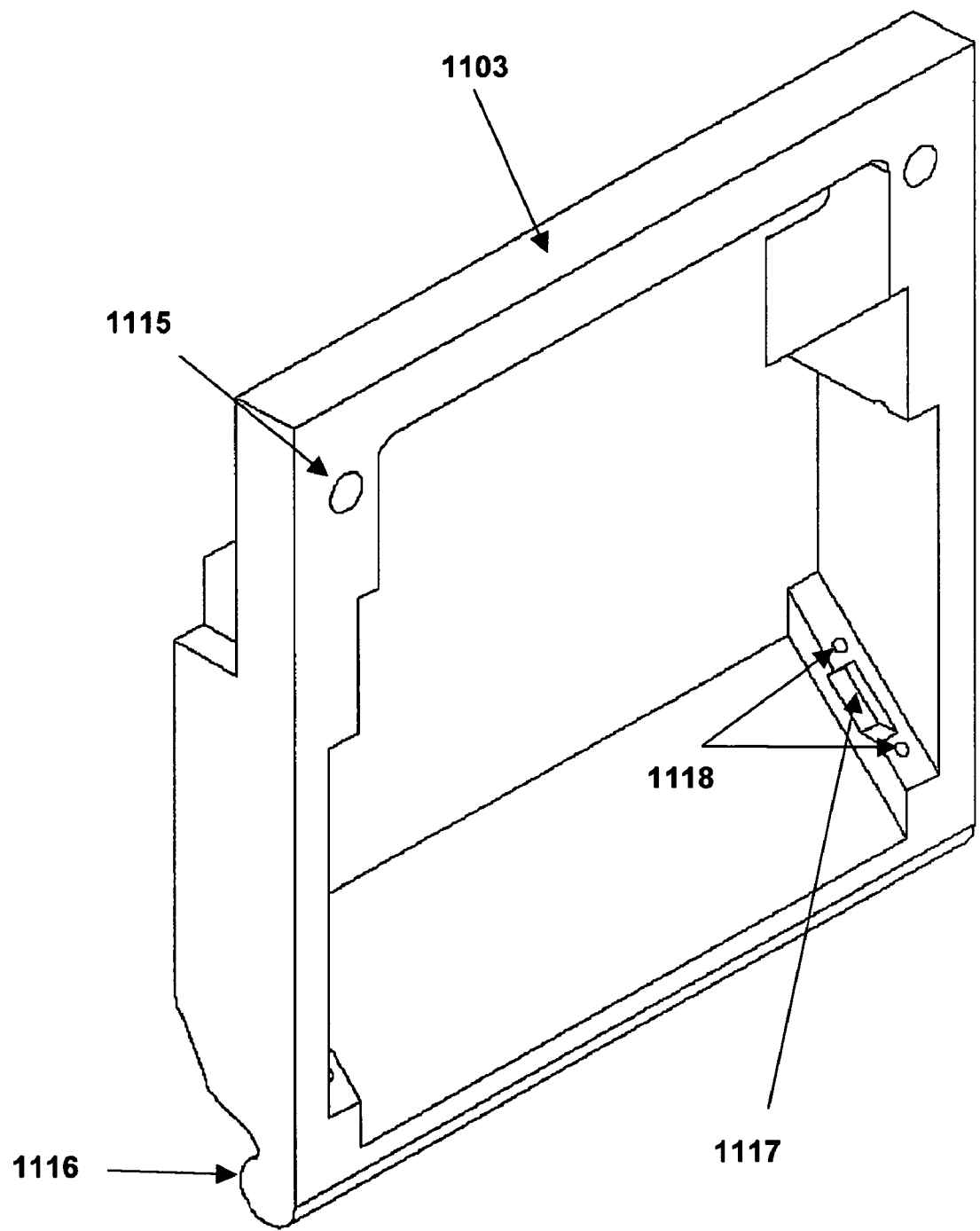
Figure 11C:
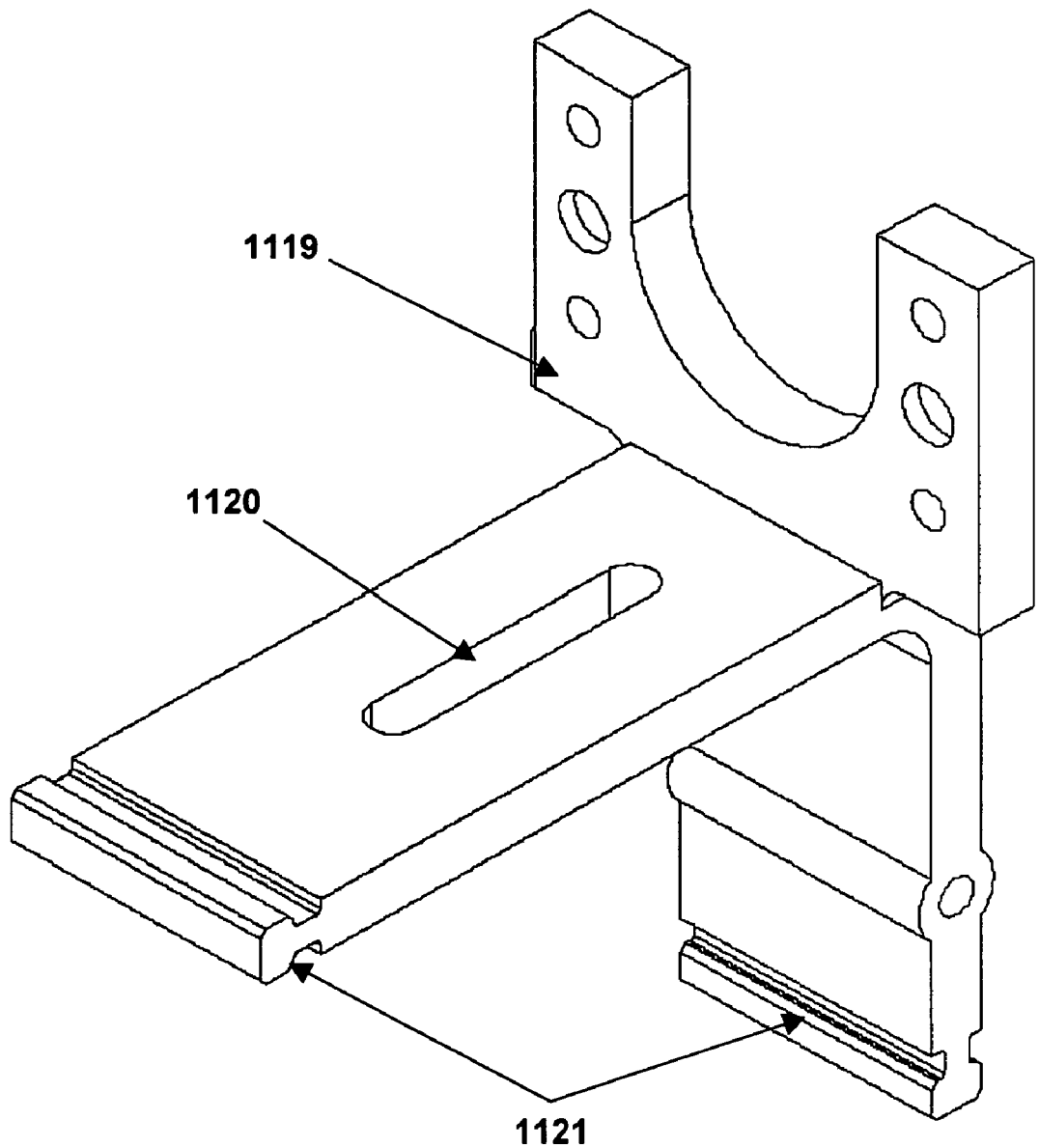
Figure 11D:
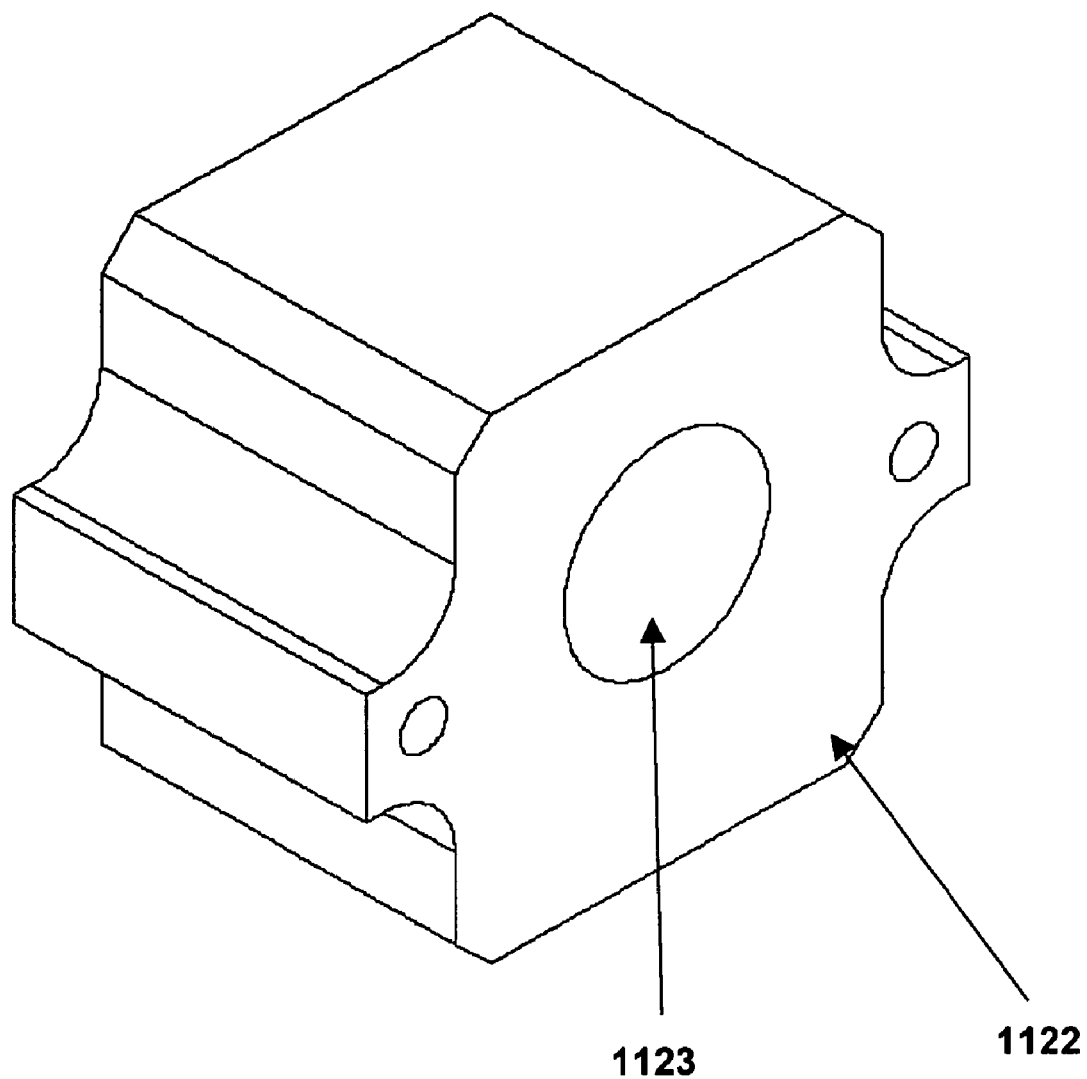
Figure 11E:
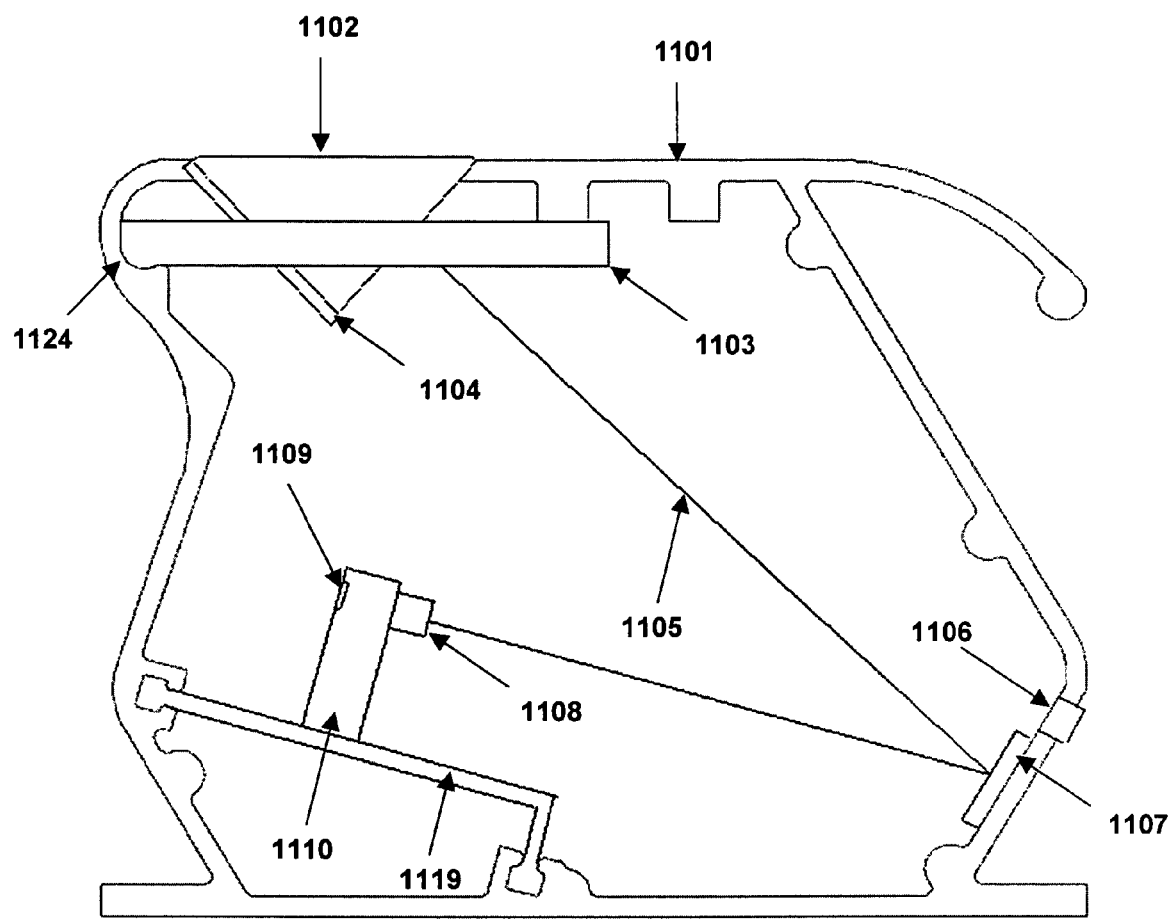

As illustrated in FIG. 9, a slip-case 900 is provided to cover the portable device when it is not in use. The slip-case 900 comprises a pair of tabs 902 to lock into a corresponding pair of cutouts 901 located in the handles 209 of the portable device. In a preferred embodiment, the slip-case is typically made of any suitably protective hard polymer. Alternatively, the device is dip-coated with an elastomer or other protective polymer (not shown).

Case

As illustrated in FIG. 11, the device case can be manufactured as a metal or plastic extrusion. Alternatively, the case can be manufactured using a variety of processes including injection molding, Thixomolding, die casting, and investment casting. Thixomolding is a type of injection molding for metals. Previous approaches to manufacturing such a case have not used extrusion since the resulting device size is too large and/or the tolerances on the extrusion have not been good enough to yield a precision device. Typically, to be manufactured as an extrusion, the desired shape needs to be able to fit within a 12 inch diameter circle since material for creating the extrusion is delivered as at most a 12 inch ingot (a cylinder of material). In this invention, since a compact size can be realized, an extrusion die can be made that creates the main case of the device as a hollow tube within this 12 inch constraint. This tube can then be machined and finished to final form. Since extrusions can be done with metals such as aluminum and magnesium and various plastics, the use of an extrusion helps minimize the device weight due to material density and an ability to have thinner walls in the case.

Method

FIGS. 8A-8D are a flow chart describing a preferred embodiment of the method of the present invention. The host computer initializes 801 the camera 204 before beginning any fingerprint capture session. This first step establishes a camera connection during which the diagnostic data is read from the non-volatile data store 203. In addition, during initialization, deviant pixels are identified and aberration correction 815 and perspective correction 815A have any required pre-computed values created. The system then waits for a request 802 that includes but is not limited to: capture a fingerprint of a given type 803 et seq., retrieve a captured image 830, retrieve diagnostic data 828-829, or end capture session 831-833.

The capture fingerprint request 803 et seq. varies according to the type of fingerprint being captured. Several capture types exist but all such captures fit in either a roll or a slap format. In the following, a composite image is defined as an image formed from one or more image frames. Therefore, a composite image includes an output image created from a sequence of scans from a linear sensor, a rolled print generated from a series of images, or even a single slap image that was the result of one processed image frame. These formats determine the processing steps of the method to be performed. The different capture types translate to different camera configuration settings. Configuration settings include area of platen to be captured, clock rate at which pixels are captured, and camera exposure time.

When a capture fingerprint request is received 802, a new capture session is initialized if an existing session does not already exist. At the beginning of each session, the camera 204 is configured for obtaining a reference offset image 803 and a reference offset image is captured 804. Next, the light source 201 is turned on under software control 804. The system begins capturing frames from the camera 204 and a calibration process compares the current frame with the previous frame. The system calculates a metric that measures the change in the luminance of the light source 201 in the middle of each captured frame. When the change in luminance fall below a pre-set tolerance, i.e., levels-off, and the rate of increase drops below a pre-set threshold, the light 201 is deemed to be "on". Once the light 201 is turned on 805, luminance levels may be measured again and adjustments to the exposure setting of the camera 204 are made until the luminance levels reach a pre-set threshold level. Exposure adjustment is necessary as light source 201 brightness decreases over time. If increasing the exposure cannot compensate for the lack of luminance from the light source 201 then the software reports that a maintenance check is required. If the session initialized properly, the settings of the camera 204 for exposure, frame time and viewing window (based on the fingerprint capture type) are set for a roll image 806 or a slap image 818. At this point, the system captures a blank frame from the camera 204 and keeps this frame as a reference gain image for a roll image 807 or a slap image 819. The process of capturing a roll or slap print now commences.

Roll Capture (FIG. 8B): Typical fingerprinting systems implement a foot pedal 212, touch screen 211, mouse, a key on a keypad, or buttons 210 to begin and end, i.e., "trigger", the start and/or stop of a fingerprint capture. Such switching mechanisms (mechanisms that signal a state change) can be located on or in the device or external to the device on a computer, for instance. Embodiments of this invention may support these modes even using different modes to signal a beginning and an end. However, the preferred embodiments rely on an automatic or "self-generated" trigger that offers the end-users complete independence from physically manipulating other devices. This trigger, implemented in one of software, firmware, or hardware, eliminates the need for manually signaling the start and end of a roll. Triggers to start and/or stop a fingerprint capture sequence are determined by statistics captured from frame sequences obtained by the camera. These statistics measure frame direction and relative frame movement between successive frames obtained by the camera to determine the type of fingerprint being captured. Once the type of fingerprint being captured is known and the device is initialized for that type of fingerprint capture, the camera obtains a sequence of frames and that sequence is analyzed for triggers. These automatic triggers may be used in conjunction with the other existing switching mechanisms described above.

In one embodiment, the process for initializing a roll occurs 808. The subject then positions the center of the finger on the platen so that the subject sees the fingerprint centered in the viewing window of the client's user interface. The subject then rolls the finger in one direction to the nail bed of the finger and then completely rolls the finger in the opposite direction to the nail bed on the other side. The fingerprint roll is complete and the fingerprint system returns to the client software to let the subject know that the fingerprint roll is complete.

During this rolling process, the host computer 206 continuously captures frames 809 from the camera 304. For each frame, the image is preprocessed with offset and gain correction 810 before a fingerprint-locating algorithm is applied. The fingerprint-locating algorithm analyzes the each frame for fingerprint data and if the subject has placed a finger on the platen, then the system locates the fingerprint 811 in the frame and generates coordinates that describe a bounding box around the fingerprint.

To compute the fingerprint location in each frame, two histograms are generated. The histograms are based upon image variance and are calculated only on each row and column index that is evenly divisible by the estimated fingerprint ridge width. The variance of the grayscale values of the pixels is calculated over an area roughly equal to the width of two ridges on the current frame for every pixel whose row and column is evenly divisible by the estimated ridge width, and whose area resides entirely within the current frame. If the variance of the pixel is greater than a pre-set threshold, then the associated positions in each histogram are incremented. Once the two histograms have been generated, the first and last entries in each histogram that are above a pre-set tolerance provide a rectangle encompassing the location of the fingerprint.

The automatic trigger process employs the current and previous fingerprint bounding box locations to determine finger travel distance and direction between frames. The center column of each fingerprint is calculated as the middle of the corresponding bounding box determined by step 811. The centers of the current and previous locations are compared to determine if the fingerprint is moving and if so, which direction the finger is moving. If the Euclidian distance between the centers of the locations is less than or equal to a predetermined number of pixels, the fingerprint is determined to be stopped. If the current frame center is greater than a predetermined number of pixels right of the previous frame, the fingerprint is determined to be rolling right. If the current frame center is greater than a predetermined number of pixels left of the previous frame, the fingerprint is determined to be rolling left. The predetermined number of pixels is typically at least about 10.

A half roll in one direction is started with a frame whose roll direction is either left or right (the direction of the half roll). The half roll is composed of a sequence of frames that have a direction of either stopped or direction of the half roll. The half roll is completed when the current frame's roll direction is opposite the direction of the half roll. If the half roll has a sufficient number of frames with a roll direction equal to the half roll direction, the full roll is begun and the capture sequence is started. Otherwise, the software returns to waiting for a half roll. The full roll is composed of a sequence of frames with roll directions opposite the direction of the half roll direction, not including stopped. The full roll is completed when the roll direction of a frame is not equal to the direction of the full roll or a sufficient number of stationary frames have been captured. If a sufficient number of frames are reached between the beginning of the full roll and the end of the full roll, the software accepts the full roll as complete. If the number of frames is insufficient, the system cancels the full roll and returns to waiting for a half roll. If at any point during the rolls the finger is removed from the platen, the software returns to waiting for a half roll.

When a roll starts or is cancelled, the composite image that represents the fingerprint roll is initialized. As frames from the camera are captured, they are processed by applying offset and gain, fingerprint location, and trigger condition analysis. If the cancel condition is indicated then the current fingerprint roll is halted and the process returns to the beginning of the fingerprint roll process 808. If, instead, the end roll condition is set then the composite image is post-processed 814 814A 815 815A 815B. If there is no trigger condition set then the current frame is merged into the composite image 813 813.1- 813.5 to create a composite roll image from a sequence of frames. The process of grabbing and processing frames continues in this manner until the roll end trigger occurs. The roll end trigger signals the end of the capture sequence.

For a roll, merging 813 into a composite image is done in five steps: 1) identifying where the current composite image and new fingerprint image overlap, 2) calculating the direction of the roll, 3) computing an initial splice line by roughly aligning the fingerprint ridges between the composite image and new fingerprint image, 4) use a quality metric to refine the splice line from the top to the bottom of the image, 5) combine the new image frame into the merged composite image using morphing along the splice line.

Overlap area 813.1: The overlap area between the merged composite image and the new fingerprint image has been described above.

Roll direction 813.2: The direction of the roll can be determined by computing which side the new fingerprint image is located. For example, if the new fingerprint image is located on the left side of the composite image then the roll direction is to the left.

Initial splice line 813.3: Create an initial splice line based on the endpoints where the new fingerprint image and the composite fingerprint image intersect in the overlap area then compute the slope of this new splice line segment. Compute the center of this new splice line segment. Determine which two fingerprint ridges, near the center of the new image and the merged composite image, have the best alignment. A metric that can be used is the local gray scale average along the splice line. This center location of the splice line is updated so to this identified best match point so that splice line refinement can occur at this reliable anchor point. Copy this new splice line and its center location and call it the composite splice line.

Splice line refinement 813.4: Starting from the center of the new splice line segment iterate up the splice line segment a pre-determined number of pixels at a time. The starting position and the ending position on the splice line identify an area of the splice line that is being refined. In the top row of this refinement region, iterate from a threshold number of pixels left of the splice point to a threshold number of pixels to the right of the splice point. Form a splice line segment candidate from the iterated pixel to the starting position on the splice line. Compute a common similarity metric between all candidate splice line segments so formed. One similarity metric computes the pixel intensity average of the two areas and compares the averages. The result of the comparison is a score that represents how close these two areas match, which represents how well the ridges line up. Once all the comparisons are done, the best refined pixel location becomes the new point on the composite splice line for this particular row. This process iterates to the top of the overlap area and from the center of the splice line segment to the bottom of the overlap area. The result is a final composite splice line based on the initial splice line.

Morphine (merging) into composite image 813.5: The existing composite image and new fingerprint image form a new composite image. The initial splice line and composite splice line control what region of the composite image gets blended with the new fingerprint image region. Iterate from the bottom of the overlap region to the top of the overlap region along both splice lines simultaneously. For each row consider the pixels on that row between the splice lines and a pre-determined threshold number of pixels outside of the splice lines. Iterate across this interval of pixels on the row and assign the value of the composite image at that location as a value weighted by distance between the two splice lines. Thus, data from the merged composite image is morphed into the data from the new fingerprint image.

The merging method to create the rolled fingerprint from a sequence of frames typically comprises the following steps. The first frame is copied to the composite image. The bounding boxes, located as described above for locate print 811, for the current and previous fingerprint locations are intersected to form an overlap area. The left of the overlap area is equal to the maximum of the left coordinates of the two bounding boxes. The top of the overlap area is equal to the maximum of the top coordinates of the two bounding boxes. The right of the overlap area is equal to the minimum of the right coordinates of the two bounding boxes. The bottom of the overlap area is equal to the minimum of the bottom coordinates of the two bounding boxes. The center columns of the overlap area in the current frame and composite image are examined to find where fingerprint ridges intersect the columns. These intersections are compared between the new frame and the composite image and they are used to perform a dynamic stretch on the current frame. If the current frame and composite image are too dissimilar then the merging is aborted and the subject is warned that the finger is moving too drastically. In this case, a new roll capture is automatically started. The current frame is stretched so that the ridges roughly intersect with the existing ridges from the composite image and the current image is morphed with the composite image to produce a new composite image. The final composite image becomes the fingerprint roll image.

Typically, adjacent opposed dark edges of two sequential bounding boxes are compared by taking a histogram to analyze each dark edge and a matching algorithm is used to match ridges to obtain an image such that the fingerprint ridges are continuous.

Image processing techniques remove image defects introduced by the camera and the lens. Six main processing steps occur: deviant pixel correction, offset and gain correction, high pass filtering, aberration correction, perspective correction, and noise filtering.

Offset and gain correction 810: Applying offset and gain is a pixel by pixel operation. For each pixel, a lowest and highest acceptable value are defined by the offset and gain images respectively. Offset and gain corrections stretch these lowest and highest values to the maximum range allowed in a pixel. Therefore, a mapping between the observed interval (from the offset and gain pixel) is made to the maximum range output. Using an observed pixel in an image as an input to this mapping yields an output pixel that has been offset and gain corrected. Input pixels below the lowest limit or above the highest limit are saturated at the respective values on output.

Deviant pixel correction 814: Most cameras contain imperfections on the sensory chip. These imperfections manifest themselves as intensity values that differ greatly from the normal expected intensity values. These deviant pixels are beyond a threshold away from the average intensity value of a neighborhood of pixels.

Deviant pixel correction involves two steps. The first step involves initializing the deviant pixel subsystem. The second step is the correction of individual frames.

Initialization, which occurs in the session initialization 801, requires an offset image acquired in camera initialization. The grayscale value of each pixel in the image below the second row and above the second to last row is compared to an average grayscale value of the two pixels above and two pixels below the current pixel. If the grayscale value of the current pixel significantly differs from the average of the other four pixels, the current pixel's location is added to a cached list for use in the second step.

Deviant pixel correction of the individual frames is relatively simple. For each pixel location cached in the first step, the system averages the grayscale values of the two pixels above and two pixels below and replaces the grayscale value of the current pixel with that average.

High pass filtering 814A: Edge details of the fingerprint ridges may be enhanced at the cost of increasing noise in the image frame. An approach to enhancing the edges is applying a high pass filter as is commonly known in the image processing field. Such filters convolve a high pass filter with the image. Typical high pass filters used may have a kernel size of 3, 5, or 7. The strength of the high-pass filter being used is driven by the application requirements.

Aberration correction 815: The camera lens also introduces image defects such as pincushion or barrel distortions. Parameters for correction of these defects are identified during calibration at the time of device manufacture and these parameters are stored in the non-volatile memory 203. In camera initialization, these parameters are read and the defect model is initialized.

The output coefficients and the defect model are used to correct a captured image using an algorithm such as the Ojanen algorithm. Correction amounts to local averaging in neighborhoods defined by the defect model and the output coefficients. Alternatively, an interpolation method such as bi-linear interpolation or nearest neighbor can be used to create an output pixel for each neighborhood.

Perspective correction 815A: Perspective correction of the image may also be performed. In using an algorithm such as the Ojanen algorithm, a mathematical description of the perspective model identified by the algorithm can be used in conjunction with an interpolation algorithm such as bi-linear interpolation to generate the final corrected composite image. Correction in the image occurs after the final roll or slap has been captured. Alternatively, if the device is made in a precision fashion, the perspective correction can be geometrically modeled as a three-dimensional relationship between planes. Once measured, the mathematical description of these planes can be used in conjunction with bi-linear interpolation to create a perspective corrected composite image. In both cases described here, the initialization step 801 preferentially pre-computes the perspective correction parameters for each pixel so that in full operation extra time would not have to be spent on calculating needed weights repeatedly.

Noise filtering 815B: The noise filter algorithm convolves the image with an averaging convolution kernel. In the convolution operation, the variance within the neighborhood is used in conjunction with a fixed threshold. If the variance exceeds the threshold then the original pixel is left unchanged otherwise, the pixel is assigned the value of the convolution. The convolution kernel size is established experimentally according to an application's requirements.

When post-processing is completed the diagnostic values are updated 816. When all the statistical data has been written back into the non-volatile memory 203, control returns to the host program. The host program then saves the final image and returns to and signals completion 817. At this point, the host software requests the image just captured, requests another fingerprint acquisition, reads non-volatile memory, or closes its session.

In alternative embodiments of capturing the rolls, the image processing steps may have their order changed and merging of the composite rolled image may occur at any stage of processing the frame.

Slap Capture (FIG. 8C): When acquiring a slap print, similar processing steps to that of the roll capture are performed. From the subject's perspective the subject places the target fingers or thumb on the platen. Frames from the camera are continuously captured and processed until the trigger condition indicates a good slap capture. For each frame captured, offset and gain correction are applied and the frame is analyzed for the presence of a trigger condition. This analysis involves calculating the variance of sub windows within the full frame. Each sub window is square with the length of the sides roughly equal to the width of two fingerprint ridges. Sub windows are centered on every pixel whose row and column index is evenly divisible by the ridge width and whose sub window area resides entirely within the current frame. If a pixel's variance is greater than a certain threshold then a count is incremented and the same operation is performed on the previous image in the same location. If the pixel's variance in the previous image is also greater than the threshold, a second count is also incremented. The ratio of the number of pixels that are above the variance threshold in both images to the number of pixels that are above the variance threshold in only the current image is used to determine how similar the two images are. If the images are similar enough for a small sequence of a few frames, the current frame has the capture condition set and the best frame (frames) is (are) saved.

If a capture image trigger condition did not occur then the process of capturing and processing frames continues 821 to 824. The final captured frame is post processed 825 825A 826 826A 826B as described above for roll capture 814 814A 815 815A 815B. When the post processing is complete the software updates diagnostic data in non-volatile memory 827, saves the image and indicates the capture is complete 828 to the host program and processes a new request 802.

In alternative embodiments of capturing the slaps, the image processing steps may have their order changed and merging of the composite rolled image may occur at any stage of processing the frame.

The present invention applies to large format fingerprint/handprint/footprint scanning as well as pet imaging applications. Other extensions of this technology to other applications are also possible. The descriptions herein are not meant to be limiting to the applications described herein but were intended to be illustrative of the application of this invention. For instance, the same invention can be applied in newborn applications in which the footprints of newborns are digitally captured, in applicant processing applications for capture and submission of fingerprints for criminal background purposes, for arrestee or detainee applications, for verification of the person's identity when the collected prints are matched against a database of prints, for access control applications, and for applications to sampling pet paws or pet noses to maintain identities of animals with certified pedigrees. Many times demographic data must be collected in conjunction with the fingerprints so that the fingerprints can be associated with a name, address, identification number, etc. Such demographic data allows expedited matching in many database systems.

What is claimed is:

1. A device configured to form a composite image of a friction ridge pattern of a subject as a fingerprint signature, the device comprising:
a light source;
a prism having a platen on a first light-reflecting surface of the prism;
a camera, wherein the light source, the prism, and the camera are disposed within the device such that if a friction ridge pattern of a subject is placed in contact with the platen, light rays emitted by the light source become incident upon the friction ridge pattern of the subject through the prism and are directed toward the camera such that the camera receives an image of the friction ridge pattern; and
a processor in communication with the camera, wherein the processor is configured to automatically start and end a capture sequence based on images of the friction ridge pattern received by the camera such that the images of the friction ridge pattern received by the camera during the capture sequence enable the formation of a composite image from a plurality of the images of the friction ridge pattern received by the camera during the capture sequence.

2. The device of claim 1, wherein the processor is configured to automatically start the capture sequence if the images of the friction ridge pattern received by the camera indicate that the friction ridge pattern is being rolled across the platen.

3. The device of claim 2, wherein the processor is configured to determine if the images of the friction ridge pattern received by the camera indicate that the friction ridge pattern is being rolled across the platen by comparing the relative position of the friction ridge pattern in images received by the camera proximate to each other temporally.

4. The device of claim 1, wherein the processor is configured to automatically end the capture sequence if the images of the friction ridge pattern received by the camera indicate that motion of the friction ridge pattern along the platen has ceased.

5. The device of claim 4, wherein the processor is configured to determine if the images of the friction ridge pattern received by the camera indicate that motion of the friction ridge pattern along the platen has ceased by comparing the relative position of the friction ridge pattern in images received by the camera proximate to each other in time.

6. The device of claim 1, wherein the processor is configured to automatically start the capture sequence if the images received by the camera indicate that the friction ridge pattern of the subject is stationary and in contact with the platen.

7. The device of claim 6, wherein the processor is configured to determine if the images received by the camera indicate that the friction ridge pattern of the subject is stationary and in contact with the platen by comparing values related to pixel variance between images received by the camera proximate to each other in time.

8. An apparatus configured to form a composite image of a friction ridge pattern of a subject as a fingerprint signature, the apparatus comprising:
a prism that transmits light rays;
a platen formed at or near a surface of the prism;
a light source that emits light rays that propagate within the prism to illuminate a friction ridge pattern of a subject placed in contact with the platen;
a camera disposed in an optical path of the light rays emitted by the light source that illuminate the platen such that the camera receives images of the friction ridge pattern of the subject if the friction ridge pattern is in contact with the platen; and
a processor in communication with the camera, wherein the processor is configured to automatically detect triggers for beginning and ending a capture sequence based on images of the friction ridge pattern received by the camera such that images of the friction ridge pattern received by the camera during the capture sequence:
(i) depict the friction ridge pattern as the friction ridge pattern is rolled across the platen, and
(ii) enable formation of a composite image from a plurality of the images of the friction ridge pattern received by the camera during the capture sequence.

9. The apparatus of claim 8, wherein the processor is configured to detect the trigger for beginning the capture sequence by analyzing images of the friction ridge pattern received by the camera to determine if an amount of displacement between the position of the friction ridge pattern in temporally proximate images exceeds a predetermined threshold.

10. The apparatus of claim 9, wherein the processor determines an amount of displacement between the position of the friction ridge pattern in temporally proximate images by determining an image center for each of a set of two or more temporally proximate images, and comparing the relative positions of the image centers.

11. The apparatus of claim 8, wherein the processor is configured to detect the trigger for ending the capture sequence by analyzing images of the friction ridge pattern received by the camera to determine if an amount of displacement between the position of the friction ridge pattern in temporally proximate images is below a predetermined threshold.

12. The apparatus of claim 11, wherein the processor determines an amount of displacement between the position of the friction ridge pattern in temporally proximate images by determining an image center for each of a set of two or more temporally proximate images, and comparing the relative positions of the image centers.

13. An apparatus that performs at least one function for collection of a friction ridge signature of a subject, the apparatus comprising:
a prism that transmits light rays;
a platen formed at or near a surface of the prism;
a light source that emits light rays that propagate within the prism to illuminate a friction ridge pattern of a subject in contact with the platen;
a camera disposed in an optical path of the light rays emitted by the light source that illuminate the platen such that the camera receives images of the friction ridge pattern of the subject if the friction ridge pattern of the subject is in contact with the platen; and
a processor in communication with the camera, wherein the processor is configured to automatically detect triggers for beginning and ending a capture sequence based on images of the friction ridge pattern received by the camera such that images of the friction ridge pattern received by the camera during the capture sequence (i) depict the friction ridge pattern held at a fixed position on the platen over a period of time, and (ii) enable formation of a composite image from a plurality of the images of the friction ridge pattern received by the camera during the capture sequence.

14. The apparatus of claim 13, wherein the processor is configured to detect the trigger for beginning the capture sequence by analyzing images of the friction ridge pattern received by the camera to determine if the friction ridge pattern of the subject is being held in contact with the platen at a fixed position on the platen.

15. The apparatus of claim 14, wherein the processor is configured to determine if the images received by the camera indicate that the friction ridge pattern of the subject is being held in contact with the platen at a fixed position on the platen by comparing values related to pixel variance between images received by the camera proximate to each other in time.

16. The apparatus of claim 13, wherein the processor is configured to detect the trigger for ending the capture sequence by analyzing images of the friction ridge pattern captured by the camera during the capture sequence to determine whether a predetermined amount of images suitable for inclusion in a composite image have been captured during the capture sequence while the friction ridge pattern is being held in contact with the platen at a fixed position.

17. A system for collecting the friction ridge signature of a subject, the system comprising:
   a processor; and
   a device, wherein the device comprises:
      a platen;
      a camera; and
      a light source positioned in the device such that if a friction ridge pattern of a subject is placed in contact with the platen and the light source is on, light rays emitted by the light source become incident on the friction ridge pattern of the subject and are directed to fall incident upon the camera to form images of the friction ridge pattern that are captured by the camera;
   wherein the processor is in communication with the camera, and the processor is configured to:
      (i) process the images captured by the camera to automatically detect a beginning and an end of a capture sequence based on the captured images;
      (ii) to analyze the images captured by the camera during the capture sequence to determine if the captured images are sufficient to form a composite image of the friction ridge pattern; and
      (iii) if the captured images are sufficient to form a composite image of the friction ridge pattern, to generate a composite image of the friction ridge pattern from the images captured by the camera during the capture sequence.

18. The system of claim 17, wherein, said device requires a total of less than 3 watts of power, weighs a total of less than 10 lbs and has a total volume of less than 400 in$^3$.

19. The system of claim 17, wherein:
   the camera requires at most about 1.8 watts of power; and
   the light source requires at most about 0.7 watts of power;
   wherein the device requires in total at most about 2.5 watts of power, weights at most 5 lbs and has a total volume of at most 315 in$^3$.

20. The system of claim 17, wherein the processor comprises a processor disposed in a computer system that is external to the device, and wherein operative connections between the computer system and the device enable data exchange between the computer system and the device, delivery of the only external power provided to the device during operation, and control of the device by the computer system.

21. The system of claim 17, wherein the processor comprises a processor provided internally within the device.

22. The system of claim 21, wherein the processor provided internally within the device comprises a functionally dedicated chip resident in the camera.

23. The apparatus of claim 17, wherein the processor is configured such that if the captured images are sufficient to form a composite image of the friction ridge pattern, the processor process the images captured by the camera to automatically detect a new beginning and a new end of a capture sequence based on the captured images.

* * * * *

UNITED STATES PATENT AND TRADEMARK OFFICE
CERTIFICATE OF CORRECTION

PATENT NO. : 8,077,934 B2  
APPLICATION NO. : 12/194359  
DATED : December 13, 2011  
INVENTOR(S) : Richard Fenrich et al.

Page 1 of 1

It is certified that error appears in the above-identified patent and that said Letters Patent is hereby corrected as shown below:

Title page, insert Item (63) as follows:

--(63)   Continuation of application No. 11/030,327, filed on Jan. 7, 2005, now Pat. No. 7,822,236.--

Title page, insert Item (60) as follows:

--(60)   Provisional application No. 60/534,394, filed on Jan. 7, 2004.--

Signed and Sealed this
Twenty-eighth Day of August, 2012

David J. Kappos
*Director of the United States Patent and Trademark Office*